United States Patent
Itakura et al.

(10) Patent No.: US 6,351,745 B1
(45) Date of Patent: Feb. 26, 2002

(54) COMMUNICATION SYSTEM FOR DISTRIBUTING SUCH MESSAGE AS ADVERTISEMENT TO USER OF TERMINAL EQUIPMENT

(75) Inventors: Yuichiro Itakura; Yuichiro Tsutsui, both of Tokyo; Nobuyuki Fujita, Kanagawa, all of (JP)

(73) Assignee: NetZero, Inc., Westlake Village, CA (US)

( * ) Notice: Subject to any disclaimer, the term of this patent is extended or adjusted under 35 U.S.C. 154(b) by 0 days.

(21) Appl. No.: 09/125,894

(22) PCT Filed: Feb. 26, 1997

(86) PCT No.: PCT/JP97/00564

§ 371 Date: Aug. 27, 1998

§ 102(e) Date: Aug. 27, 1998

(87) PCT Pub. No.: WO97/32258

PCT Pub. Date: Sep. 4, 1997

Related U.S. Application Data

(63) Continuation of application No. 08/795,397, filed on Feb. 4, 1997, now abandoned.
(60) Provisional application No. 60/022,171, filed on Jul. 15, 1996, and provisional application No. 60/023,577, filed on Aug. 19, 1996.

(30) Foreign Application Priority Data

Feb. 28, 1996 (JP) .......................................... H8-067278
May 10, 1996 (JP) .......................................... H8-139689

(51) Int. Cl.⁷ .............................................. G06F 17/30
(52) U.S. Cl. ........................ 707/10; 707/104; 709/217; 705/52; 705/400
(58) Field of Search ........................... 707/526, 10, 102, 707/104; 709/203, 224, 217; 705/1, 14, 26, 52, 400

(56) References Cited

U.S. PATENT DOCUMENTS

| | | | |
|---|---|---|---|
| 5,019,963 A | 5/1991 | Alderson et al. | 707/102 |
| 5,105,184 A | 4/1992 | Pirani et al. | 345/115 |
| 5,305,195 A | 4/1994 | Murphy | 705/1 |
| 5,319,455 A | 6/1994 | Hoarty et al. | 725/34 |
| 5,446,919 A | 8/1995 | Wilkins | 725/35 |

(List continued on next page.)

FOREIGN PATENT DOCUMENTS

| | | |
|---|---|---|
| EP | 0 749 081 A1 | 12/1996 |
| EP | 0 822 535 A2 | 2/1998 |
| WO | WO 97/21183 | 6/1997 |
| WO | WO 97/40447 | 10/1997 |
| WO | WO 97/40514 | 10/1997 |

(List continued on next page.)

Primary Examiner—Jean R. Homere
Assistant Examiner—Greta L. Robinson
(74) Attorney, Agent, or Firm—Steven C. Sereboff

(57) ABSTRACT

In the communication network for distributing messages such as advertisements to terminal users, an information providing system provides the suitable information to each user. The system includes a terminal connected to a communications network, a user database for storing the characteristics of each user, a message database for storing messages, and a transmittal condition database for storing the user characteristics of the class of suitable recipients for each message. A message searcher searches for messages from the transmittal condition database based on the characteristics read out from the user database. A reader reads the retrieved messages from the message database and a transmitter transmits the messages to the terminal. An adder increases the value of a parameter associated with each user when the transmitted message is displayed on the terminal. A detector detects whether the user is active, and a stop means prevents the value of the parameter from being increased when the user is inactive.

62 Claims, 37 Drawing Sheets

U.S. PATENT DOCUMENTS

| | | | |
|---|---|---|---|
| 5,504,675 A | 4/1996 | Cragun et al. | 705/14 |
| 5,636,346 A | 6/1997 | Saxe | 705/1 |
| 5,643,088 A | 7/1997 | Vaughn et al. | 463/40 |
| 5,717,923 A | 2/1998 | Dedrick | 707/102 |
| 5,721,827 A | 2/1998 | Logan et al. | 709/217 |
| 5,724,521 A | 3/1998 | Dedrick | 705/26 |
| 5,724,567 A * | 3/1998 | Rose et al. | 707/2 |
| 5,740,549 A | 4/1998 | Reilly et al. | 705/14 |
| 5,761,662 A | 6/1998 | Dasan | 707/10 |
| 5,768,521 A | 6/1998 | Dedrick | 709/224 |
| 5,794,210 A | 8/1998 | Goldhaber et al. | 705/14 |
| 5,809,242 A | 9/1998 | Shaw et al. | 709/217 |
| 5,812,784 A | 9/1998 | Watson | 709/227 |
| 5,823,879 A | 10/1998 | Goldberg et al. | 463/42 |
| 5,884,309 A * | 3/1999 | Vanechanos, Jr. | 707/10 |
| 5,913,040 A | 6/1999 | Rakavy et al. | 709/232 |
| 5,918,014 A | 6/1999 | Robinson | 709/219 |
| 5,933,811 A | 8/1999 | Angles et al. | 705/14 |
| 5,946,646 A | 8/1999 | Schena et al. | 702/177 |
| 5,946,664 A | 8/1999 | Ebisawa | 705/14 |
| 5,959,623 A | 9/1999 | van Hoff et al. | 345/333 |
| 6,009,409 A | 12/1999 | Adler | 705/14 |
| 6,009,410 A | 12/1999 | LeMole et al. | 705/14 |
| 6,026,368 A | 2/2000 | Brown et al. | 705/14 |
| 6,036,601 A | 3/2000 | Heckel | 463/42 |
| 6,085,229 A | 7/2000 | Newman et al. | 709/203 |
| 6,108,637 A * | 8/2000 | Blumenau | 705/7 |

FOREIGN PATENT DOCUMENTS

| | | |
|---|---|---|
| WO | WO 97/41673 | 11/1997 |
| WO | WO 98/35300 | 8/1998 |
| WO | WO 00/3008 | 5/2000 |

\* cited by examiner

MESSAGE USER DATABASE 34(A) — 310

| MESSAGE USER ID | MESSAGE USER PASSWORD | PROVIDER ID | PROVIDER USER ID | DISPLAYED TIME | USER IMFORMATION ||||||
|---|---|---|---|---|---|---|---|---|---|
| | | | | | DATE OF BIRTH | SEX | MARRIED | OCCUPATION | ADDRESS |
| XXX | YYY | A | ZZZ | 1:00:15 | 1968.6.2 | MALE | NO | CORPORATION | SHINJYUKU-KU TOKYO |
| AAA | BBB | B | CCC | 0:15:34 | 1967.1.7 | FEMALE | YES | FREE | ICHIKAWA CHIBA |
| OOO | PPP | A | QQQ | 15:23:56 | 1980.11.24 | MALE | NO | STUDENT | SHIBUYA-KU TOKYO |
| ...... | ...... | ...... | ...... | ...... | ...... | ...... | ...... | ...... | ...... |

Columns: 312 (DATE OF BIRTH), 314 (SEX), 316 (MARRIED), 318 (OCCUPATION), 320 (ADDRESS)

MESSAGE USER DATABASE (B)

| CREDIT CARD NUMBER | LIMITATION | NAME | LAST COMMUNICATION TIME | THE MONTH BEFORE LAST PARAMETER | LAST MONTH PARAMETER | THIS MONTH PARAMETER |
|---|---|---|---|---|---|---|
| 2934-5612-6847-5587 | 98/6 | TARO YAMADA | 1996.3.31 23:00 | 471 | 516 | 724 |
| 4879-5517-5001-6901 | 97/9 | ICHIRO TANAKA | 1996.4.4 21:15 | 436 | 325 | 628 |
| 9540-1735-9927-0513 | 97/4 | JIRO SUZUKI | 1996.4.2 00:45 | 488 | 412 | 509 |
| ......... | ......... | ......... | ......... | ......... | ......... | ......... |

332, 334, 336

TRANSMITTAL CONDITION DATABASE 36(A)

| MESSAGE URL | INDIVIDUAL LIMIT TYPE | INDIVIDUAL LIMIT | TOTAL LIMIT TYPE | TOTAL LIMIT | DISPLAYED TIME | AGE | SEX | MARRIED | OCCUPATION | ADDRESS | RELATED MESSAGES |
|---|---|---|---|---|---|---|---|---|---|---|---|
| A | DAY | 3 | DAY | 1000 | --- | 18-22 | MALE | NO | CORPORATION | TOKYO | C |
| B | TOTAL | 10 | MONTH | 10000 | --- | --- | FEMALE | YES | STUDENT | KANAGAWA | --- |
| C | MONTH | 8 | MONTH | 500 | 1996.1.1 /12:00 | --- | --- | NO | --- | KANTO | A |
| ... | ... | ... | ... | ... | ... | ... | ... | ... | ... | ... | ... |

TRANSMITTAL CONDITION DATABASE 36(B) — 210

| | INFORMATION PROVIDER 20. A | | | | | INFORMATION PROVIDER 20. B | | | | | ABSOLUTE LIMIT |
|---|---|---|---|---|---|---|---|---|---|---|---|
| MESSAGE UNIT PRICE | BUTTON UNIT PRICE | TERM TYPE | TERM LIMIT | TOTAL LIMIT | PARA-METER | MESSAGE UNIT PRICE | BUTTON UNIT PRICE | TERM TYPE | TERM LIMIT | TOTAL LIMIT | PARA-METER | |
| 30 | 60 | MONTH | 10000 | 50000 | 2 | 40 | 80 | MONTH | 5000 | 25000 | 3 | 100000 |
| 20 | 40 | MONTH | 20000 | 10000 | 2 | 30 | 60 | MONTH | 10000 | 50000 | 3 | 200000 |
| 30 | 60 | WEEK | 10000 | 50000 | 2 | 40 | 80 | WEEK | 5000 | 25000 | 3 | 100000 |
| 0 | 0 | MONTH | 99999 | 99999 | 0 | 0 | 0 | MONTH | 99999 | 99999 | 0 | 999999 |
| 212 | 214 | 216 | 217 | 218 | 219 | | | | | | | 220 |

CONNECTION LOG 38

| PROVIDER ID | PROVIDER USER ID | EVENT | DATE | TIME |
|---|---|---|---|---|
| A | XXX | LOGIN | 1996.1.31 | 0:15:00 |
| A | XXX | CHARGE HALT | 1996.1.31 | 0:15:01 |
| B | AAA | LOGIN | 1996.1.31 | 1:21:15 |
| A | XXX | CHARGE START | 1996.1.31 | 2:09:05 |
| A | XXX | CHARGE HALT | 1996.1.31 | 2:15:08 |
| B | BBB | ......... | ......... | ......... |
| A | CCC | | | |

*FIG.11*

| MESSAGE USER ID | MESSAGE ID | DISPLAYED DATE | DISPLAYED TIME | LOG TYPE |
|---|---|---|---|---|
| OOO | B | 1996.8.25 | 12:00 | 1 |
| SSS | A | 1996.8.25 | 12:05 | 3 |
| BBB | L | 1996.8.25 | 12:06 | 2 |
| ...... | ...... | ...... | ...... | ...... |

1 : DISPLAY
2 : HOMEPAGE DISPLAY
3 : MATERIAL REQUEST

*FIG.12*

| MESSAGE USER ID | MESSAGE DISPLAY TIMES | HOMEPAGE DISPLAY TIMES | MATERIAL REQUEST |
|---|---|---|---|
| CCC | 4 | 1 | 1 |
| DDD | 1 | 0 | 0 |
| QQQ | 2 | 1 | 0 |
| ...... | ...... | ...... | ...... |

*FIG.23*

| | DISPLAY TIMES | HOMEPAGE DISPLAY TIMES | NUMBER OF PEOPLE WHO DISPLAYED MESSAGES | HOMEPAGE NUMBER OF PEOPLE WHO DISPLAYED MESSAGES | NUMBER OF PEOPLE REQUESTING MATERIALS |
|---|---|---|---|---|---|
| TOTAL | | | | | |
| MAN | | | | | |
| FEMALE | | | | | |
| ~20 YEARS OLD | | | | | |
| 21~30 YEARS OLD | | | | | |
| 31~40 YEARS OLD | | | | | |
| 41~50 YEARS OLD | | | | | |
| TOKYO | | | | | |
| CHIBA | | | | | |
| ····· | ····· | ····· | ····· | ····· | ····· |

*FIG.24*

COMMUNICATION SYSTEM FOR DISTRIBUTING SUCH MESSAGE AS ADVERTISEMENT TO USER OF TERMINAL EQUIPMENT

This application is a continuation of application Ser. No. 08/795,397 filed Feb. 4, 1997 now abandoned.

This application is the national phase of international application PCT/JP97/00564 filed Feb. 26, 1997 which designated the U.S.

This application also claims the benefit of U.S. Provisional Appliction Nos. 60/022,171; 60/023,577 filed Jul. 15, 1996; Aug. 19, 1996.

FIELD OF THE INVENTION

This invention relates to a communication system that searches for messages suitable to individual users from, for example, Internet, and provides the messages to the users. The present invention is related to the following five Japanese patent applications, the contents of which are incorporated herein by reference.

Patent application No. 8-9521 filed on Jan. 23, 1996

Patent application No. 8-67278 filed on Feb. 28, 1996

Patent application No. 8-139689 filed on May 10, 1996

Patent application No. 8-139690 filed on May 10, 1996

Patent application No. 8-163679 filed on Jun. 5, 1996

RELATED APPLICATION INFORMATION

This application is related to:

application Ser. No. 09/125,833 filed Feb. 26, 1997, entitled "Communication System Capable of Providing User with Picture Meeting Characteristics of User and Terminal Equipment and Information Providing Device Used for the Same," now U.S. Pat. No. 6,157,946, issued Dec. 5, 2000.

application Ser. No. 09/633,407 filed Aug. 7, 2000, entitled "Advertising Supported Internet Access Service."

application Ser. No. 09/188,571 filed Nov. 10, 1998, entitled "Message Searching System and Terminal."

application Ser. No. 09/206,385 filed Dec. 7, 1998, entitled "Information Provider, Terminal And System And Recording Medium For The Terminal."

application Ser. No. 09/117,331 filed Nov. 6, 1998, entitled "System For Displaying Two Independent Images From Network."

application Ser. No. 09/276,708 filed Mar. 26, 1999, entitled "Terminal Which Stores Information on Communication Network in Local Memory Automatically."

Internet users can communicate with various host computers within Internet through a host computer (which is called an information provider) offered by an Internet provider. The terminal connected to Internet reads out images, such as home pages, as designated by the user, and displays the images.

Recently, many virtual shops have been established on Internet, and users can purchase goods by mail-order through Internet. Programs and data are also sold through Internet. Payment for these goods or services is made by transmitting a credit card number and expiration date over Internet.

Advertisement of such goods and services from virtual shops, as well as advertisement of goods or services offered by ordinary retailers are often seen on communications networks. For example, the home page of Yahoo (trademark), which is a search engine for home pages on Internet, displays advertisements as sidebars.

To sell goods or services efficiently using advertisements and the payment system mentioned above, a counter system is also used to count the number of times users access the home pages of virtual shops which sell goods or services. Based on the counter results, advertisers can estimate, to some extent, whether an advertisement has been effective.

BACKGROUND OF THE INVENTION

However, a conventional counter system can not accurately measure the number of times that users actually look at a particular advertisement, because it is not known whether the users are actually watching that advertisement when the advertisement is displayed on users' terminals. In particular, when an advertisement using moving pictures is displayed for a certain period of time, users may stop watching the advertisement halfway through.

Furthermore, as the amount of information offered on communications networks, such as Internet, increases, it becomes difficult for a user to find appropriate information or advertisements for goods or services, which the user is actually interested in. It is also difficult for an information provider to supply information to users for whom that information is suitable, because the users who utilize Internet have become a highly diverse group of consumers.

In addition, concerning payment for goods or services, there is the possibility that a credit card number or expiration date may be improperly used by a third party because the credit card number or expiration date is transmitted on the communications network, and many people can access the communications network. Since information transmitted on Internet is recorded in several servers (host computers), it is dangerous for users to transmit their credit card information. This situation curbs the growth of sales of goods and services via communications networks. While systems for encoding credit card information and transmitting the encoded information have been developed this information remains insecure when transmitted over Internet because the codes can be decoded.

If an advertisement is embedded in a home page on Internet, the advertisement can not be offered to a user until the user actually accesses the home page. Further, when the user scrolls down the home page in the window, the advertisement disappears from the window. Also, when another window is opened over the browser window, or the browser window is moved off the screen, the advertisement does not reach the user.

With the conventional counter system, the user easily manipulates the number of times a home page is accessed, for example, by repeatedly accessing the home page for the purpose of increasing the number of times accessed. In such a case, the counter result for that home page or its advertisement is deceptive and not correct. Moreover, the conventional counter system can not offer information about what types of users access what kinds of home pages or advertisements. It is difficult to determine from the counter results of the conventional system who the target customers of a particular good or service are and how the good or service should be marketed.

For example, it is highly probable that those users who are interested in the product "skis" will also take an interest in the product "ski suit" or the service "ski tour". Several goods or services are often related in this way, all appealing to the same customers. However, the conventional counter system can not identify such related goods or services that users would be interested in, and therefore fails to efficiently market the appropriate goods or services to users.

To use a communications network, such as Internet, users have to pay a connection fee to Internet provider who owns the host computer to which the user's terminal is connected. This fact discourages users from accessing the communications network for a long time, which presents an obstacle to expanding advertising, sales or payment transactions via communications networks.

It is an object of this invention to provide a communication system, which can overcome all of the problems, described above.

SUMMARY OF THE INVENTION

In order to achieve the above object, the communication system according to the first aspect of the invention has a message database which stores an image, text, sound, or combination thereof to transmit to a terminal. The message read out from the message database is transmitted to a terminal, and displayed on the terminal. The message database also stores a parameter for each user, the parameter representing the amount of access by the associated user. When a message is displayed on a terminal, the value of the parameter for the user of that terminal is increased. However, if the user is not actively recognizing the message, the value of the parameter is not increased. In this configuration, the value of the parameter is increased only when the user actively views the message. Accordingly, the extent to which a user accesses a message (the amount of access) can be measured more accurately because apparent access by inactive users can be measured and discounted.

The communication system according to the second aspect of the invention has a user database, which stores characteristics of the respective terminal users, and a transmittal condition database, which stores a message ID in association with user characteristics suitable for that message and which is used for identifying messages based on those user characteristics. When a user requests a message, the user's characteristics are read out from the user database based on a user ID for identifying the user. Then, a message ID is searched from the transmittal condition database based on the user's characteristics read out from the user database. The messages found by the message searcher are read out from the message database, and transmitted to the user's terminal. In this configuration, those messages that satisfy particular search conditions, which correspond to certain user characteristics, are searched for. As a result, users can readily find advertisements for goods or services, which match their interests, and advertisers can efficiently provide messages to potential users who have a high probability of purchasing their goods.

The communication system according to the third aspect of the invention has a means for selling goods and services to users through a communications network. The price of a good or service is discounted according to the value of the aforementioned parameter assigned to the user. When a good or service is sold to a user, the value of the parameter for the user is decreased. In this configuration, the price of a good or service is modified according to the value of the parameter, which corresponds to the frequency of accessing messages. Those users who have parameters with higher values will pay less for the same goods or services. This encourages users to operates messages frequently and actively.

The communication system according to the fourth aspect of the invention determines whether or not a user is active by detecting whether any actions are performed on the terminal within a predetermined period of time. For example, if the user is away from the terminal for a while, the aforementioned parameter is prevented from being increased.

The communication system according to the fifth aspect of the invention provides an operation window when displaying a message on a terminal. The communication system determines if the user is active by detecting whether or not the operation window has been operated on. Even if a plurality of windows is opened on the terminal, the aforementioned parameter is increased only when the user is actually watching the operation window, which shows the message.

The communication system according to the sixth aspect of the invention determines if the user is active by detecting whether or not the user returns an appropriate answer in response to the text contained in a message. This prevents the situation in which the parameter is increased even when the user gives an unreasonable answer without reading the text displayed in the window.

The communication system according to the seventh aspect of the invention stops increasing the value of the parameter by interrupting the display of the message on the users terminal. This configuration prevents messages from being transmitted to terminals in vain when the user is not actively recognizing the message.

In the communication system according to the eighth aspect of the invention, the message database has a first message for increasing the value of the parameter when it is displayed on the user's display, and a second message which does not increase the value of the parameter even if it is displayed on the display. When it is determined that the user is not active, the communication system stops transmitting the first message in order to prevent the value of the parameter from increasing. The second message is continuously transmitted to the terminal without increasing the value of the parameter.

The communication system according to the ninth aspect of the invention further has a connection means for accessing Internet which has host computers. The user's terminal establishes a first data link with a host computer through a communications network and Internet, and establishes a second data link to the transmittal condition database through a communications network. The user transmits data to the message-transmission database using the second data link. Because two independent data links are established, the terminal can transmit a request for a message to the transmittal condition database and receive information for identifying the message, while the user is accessing desired home pages through the first data link.

In the communication system according to the tenth aspect of the invention, when the terminal user requests access to a host computer connected to Internet, the communication system transmits an identification signal for identifying a transmitter for the terminal. The terminal establishes a data link with the transmitter using the identification signal, and further establishes the aforementioned second data link. The terminal can identify the transmitter using the identification signal promptly and reliably.

The communication system according to the eleventh aspect of the invention increases the value of the aforementioned parameter on the condition that the user appropriately responds to the question contained in the message displayed on the display. This configuration urges users to respond to the question.

The communication system according to the twelfth aspect of the invention stores update information, which is updated independently of the terminal, and transmits the update information to each terminal through a communications network a predetermined number of times. This information, for example, information about the updating of the communications software, is important to users. Conventional Internet providers do not have a means for actively notifying users of this information via Internet browser. However, in the present invention, the communication system can display this information on the terminal a predetermined number of times without fail.

The communication system according to the thirteenth aspect of the invention determines whether the update information has already been transmitted to the user. If it has not, the communication system transmits the update information to the user. The update information is reliably transmitted to every user at least once without fail.

The communication system according to the fourteenth aspect of the invention counts the number of times the update information was transmitted to each user. If the update information has not been transmitted to the user the predetermined number of times, then the communication system transmits the update information at the time the terminal is connected to the communication system. As soon as the communication starts up between the terminal and the communication system, the update information is displayed on the terminal.

In the communication system according to the fifteenth aspect of the invention, new update information is transmitted to the user when a predetermined period has passed since the last transmission of the update information. If the predetermined time is set to the time the information was updated last, the update information is automatically transmitted to the user once, at the next connection.

The communication system according to the sixteenth aspect of the invention has a message database which stores at least one of images, texts, sounds and combinations thereof. This data is transmitted to a terminal connected to a communications network. The communication system further has a display means for displaying the message transmitted to the terminal, a user database which is connected to the communications network and stores users' characteristics, and a transmittal condition database which is connected to the communications network and stores the message ID in association with user characteristics suitable for that message for identifying a message based on those user characteristics.

When the user requests a message, the user's characteristics are read out from the user database based on the user ID for identifying the user. Then, a message ID is searched from the transmittal condition database based on the user's characteristics, which were read out from the user database. The messages found by the message searcher are read out from the message database, and transmitted to the terminal. In this configuration, appropriate messages are searched for based on users' characteristics, and transmitted to the respective users. Thus users can find advertisements for the goods or services in which they are interested.

In the communication system according to the seventeenth aspect of the invention, when the user operates a message, the communication system stores the type of the operation (i.e. message display, home page display, or materials request) and the user's ID in association with the message ID for identifying that message. This configuration allows for the determination of the types of operations executed by each user. The conventional method was not capable of extracting the number of times messages were operated or the types of operations for each user. Moreover, the communication system of the preferred embodiment searches each user's characteristics from the user database using the recorded user ID, and the searched user characteristics found and the type of operation are stored in association with the message ID. Thus message providers can know the characteristics of the user, such as sex, age, etc.

The communication system according to the eighteenth aspect of the invention stores a user ID for identifying a user who operates a message, in association with the message ID for identifying that message. The transmittal condition database stores the message ID of a target message in association with message IDs of other related messages. When users request a message, the message searcher means searches all the messages and retrieves those messages whose user ID is the same as that of the requested message ID. The target messages are transmitted to only those users who operated the messages that are associated with the target message. For example, the advertisement message for the goods "ski suit" is associated with the advertisement message for the goods "skis". The advertisement message for "ski suit" is supplied to only those users who operates the advertisement message for "skis".

BRIEF DESCRIPTION OF THE DRAWINGS

FIG. 7 shows part of the structure of the message user database 34.

FIG. 8 shows part of the structure of the message user database 34.

FIG. 9 shows part of the structure of the transmittal condition database 36.

FIG. 10 shows part of the structure of the transmittal condition database 36.

FIG. 11 shows a connection log 38.

FIG. 12 shows a message access log 37.

FIG. 23 illustrates a message user file indicating the users who has operated messages.

FIG. 24 is a statistics file indicating the statistics of the operations to messages.

PREFERRED EMBODIMENT OF THE PRESENT INVENTION

1. First Embodiment 1.1 Construction 1.1.1 System Construction

Figure 1:
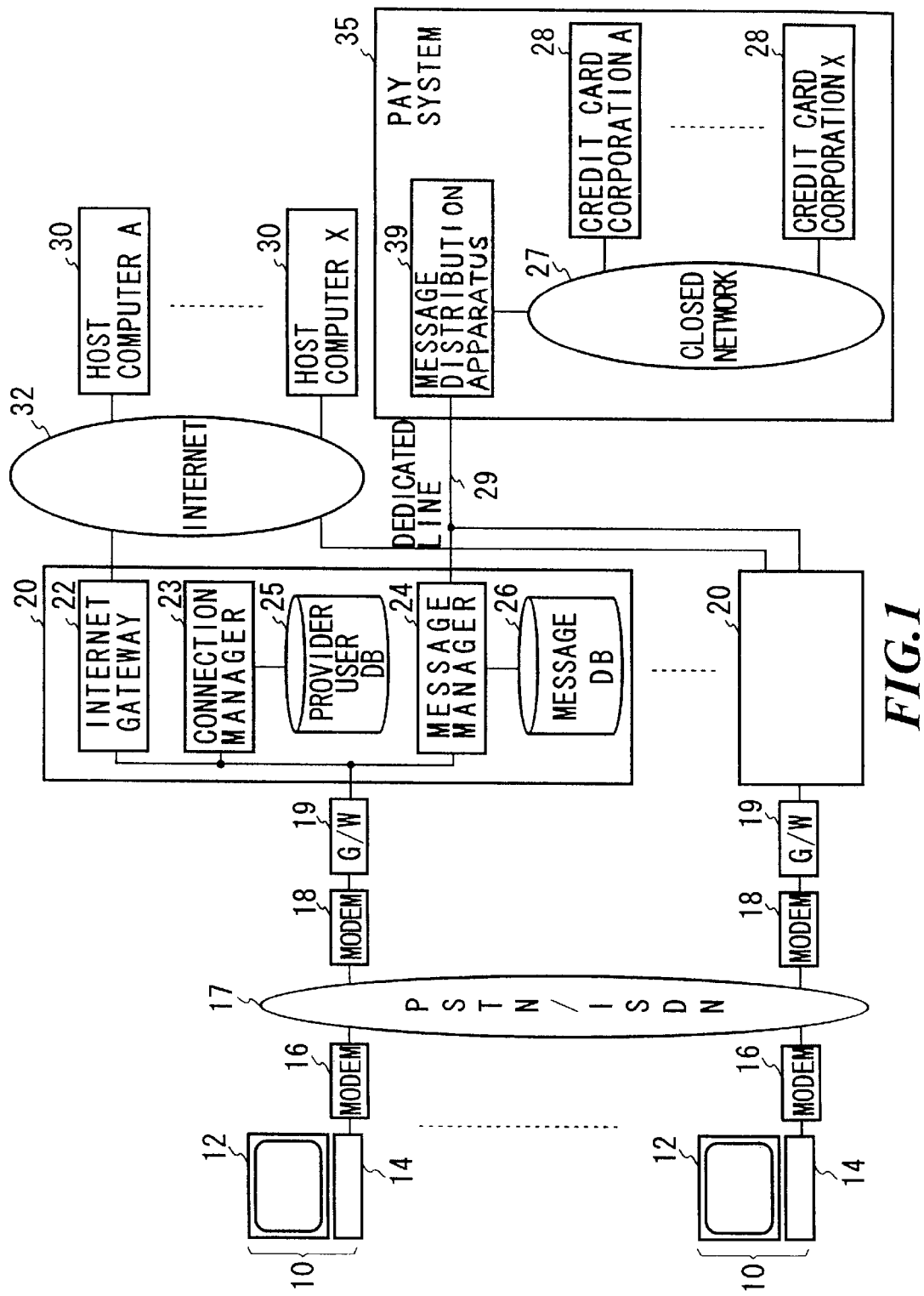
FIG. 1 is a block diagram of the overall hardware construction of the communication system according to the first embodiment.

FIG. 1 shows the overall structure of the communication system of the first embodiment. One or more terminals 10 are connected to each of the information providers 20 through the modems 16 and 18, public network (communications network) 17 and a public network gateway 19. The information provider 20 is administered by Internet provider, and is connected to a plurality of host computers 30 through Internet 32. The information provider 20 is also connected to the pay system 35 through a dedicated line 29.

In the pay system 35, the message distribution apparatus 39 is connected to the computer of a credit card company through a closed network 27, such as CAFIS™ (a preliminary communications network: a network for connecting the host computer of the credit card company with the user terminal). The message distribution apparatus 39 is also connected to a plurality of information providers 20 by a dedicated line. The message distribution apparatus 39 transmits information (i.e., messages) regarding goods, such as advertisements, which are offered by a store selling goods on the network. Messages may include still images, dynamic images, sound images or combinations thereof. Each message contains data, which represents the home page address of the store on the World Wide Web (WWW). The message manager 24 of the information provider 20 stores messages received from the message distribution apparatus 39 in association with an ID, such as the message URL, which it assigns to each message.

The host computer 30 stores a home page of each of the stores and its lower pages. The terminal 10 can receive information, such as home pages, from Internet 32 through Internet gateway 22 of the information provider 20. The user can order goods by accessing the home page of a store and its lower pages. The terminal 10 can also receive messages from the message manager 24. The message manager 24 reads a message from the message database 26 based on a request from the terminal 10, and transmits the message to the terminal 10. Each user has an Internet provider's user ID and a password for connecting to Internet gateway 22 through the public network gateway 19, as well as a message user ID and a password for obtaining a message from the message manager 24.

1.1.2 Main Body 14

Figure 2:
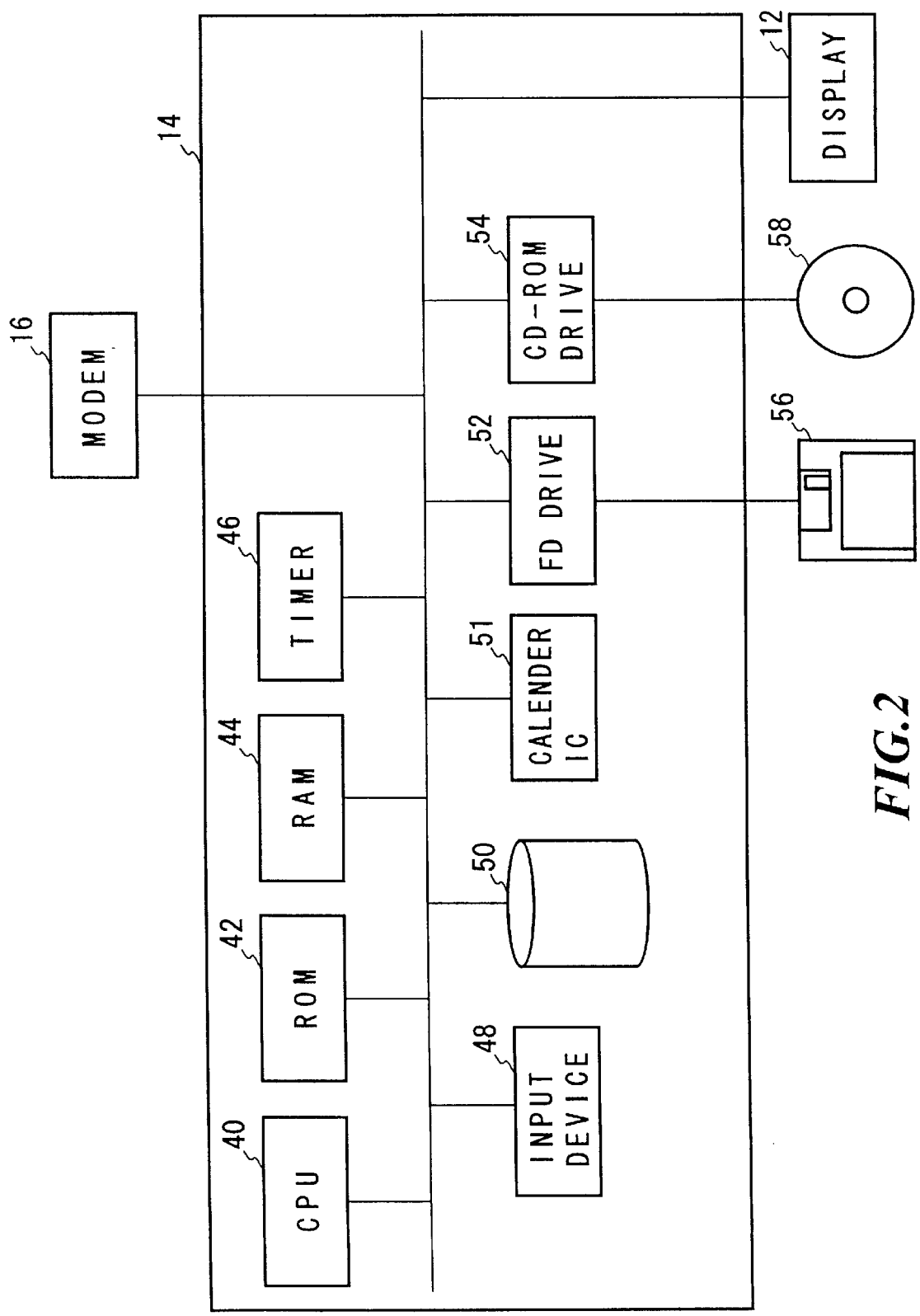
FIG. 2 is a block diagram of the hardware construction of the terminal 10.

FIG. 2 shows the hardware block diagram of the main body 14 of the terminal 10. The CPU 40 operates based on a program stored in the RAM 44 and the ROM 42. The timer 46 counts a predetermined period of time. The user inputs data though the input device 48. The hard disk drive 50, which is an example of the storage media, stores data (e.g. image data), user information, and programs to be operated by the CPU 40.

The calendar IC 51 is backed up by the battery, and provides the current time and date to the CPU 40. The floppy disk drive 52 reads data or programs from the floppy disk 56 and provides them to the CPU 40. The CD-ROM drive 54 reads data or programs from the CD-ROM 58 and provides them to the CPU 40. The main body 14 has an interface for connecting to the modem 16 and the display 12.

1.1.3 Software of Terminal 10

Figure 3:
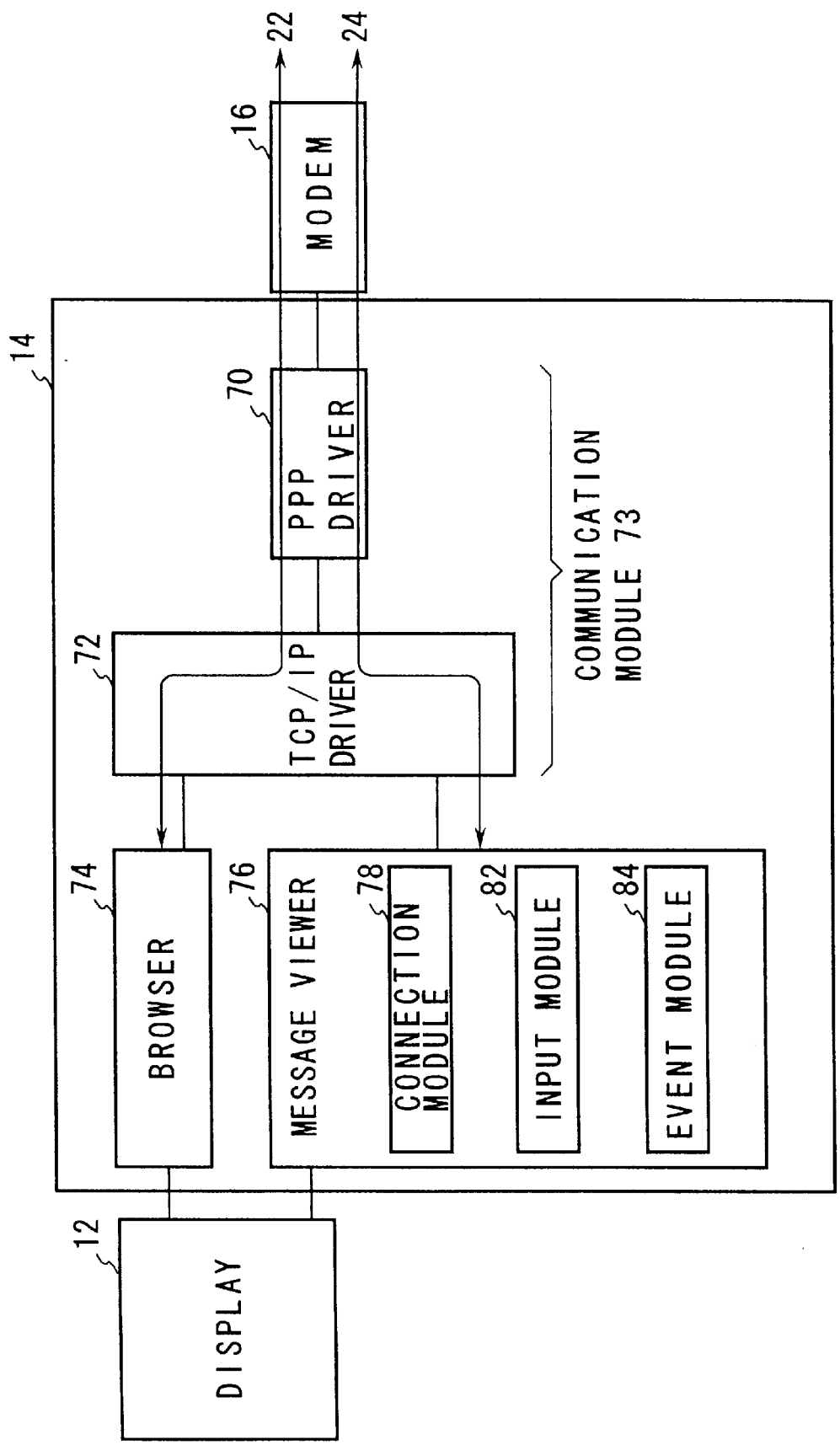
FIG. 3 shows the functional construction of the software executed by the CPU 40 of the main body 14.

FIG. 3 shows the functional structure of the software, which is executed by the CPU 40. The software is provided to the user from the recording medium, such as a floppy disk 56 or CD-ROM 58, in which it is stored. The software stored in the recording medium may be compressed or uncompressed. The software is installed in the hard disk drive 50 from the recording medium, and is read out by the RAM 44 to be executed by the CPU 40.

The software stored in the recording medium and provided to the user (that is, the software to be installed in the hard disk drive 50) contains the communication module 73 including the PPP driver 70, the TCP/IP driver 72, the browser 74 and the message viewer 76. The PPP driver 70 creates a data link on one physical line to the public network gateway 19 (FIG. 1). The browser 74 communicates with Internet gateway 22 through the TCP/IP driver 72 on the data link created by the PPP driver 70. The browser 74 receives and displays images on the display 12. Suitable examples of the browser 74 include NETSCAPE™ and MOSAIC™.

The message viewer 76 communicates with the message manager 24 through the TCP/IP driver 72 on the data link created by the PPP driver 70. The message viewer 76 receives and displays images on the display 12. The message viewer 76 contains the connection module 78 for connecting to the message manager 24, the input processing unit 82 for processing the user input, and the event process module 84 for processing events, which occur due to the request inside or on the communication line.

1.1.4 Display 12 of Terminal 10

Figure 4:
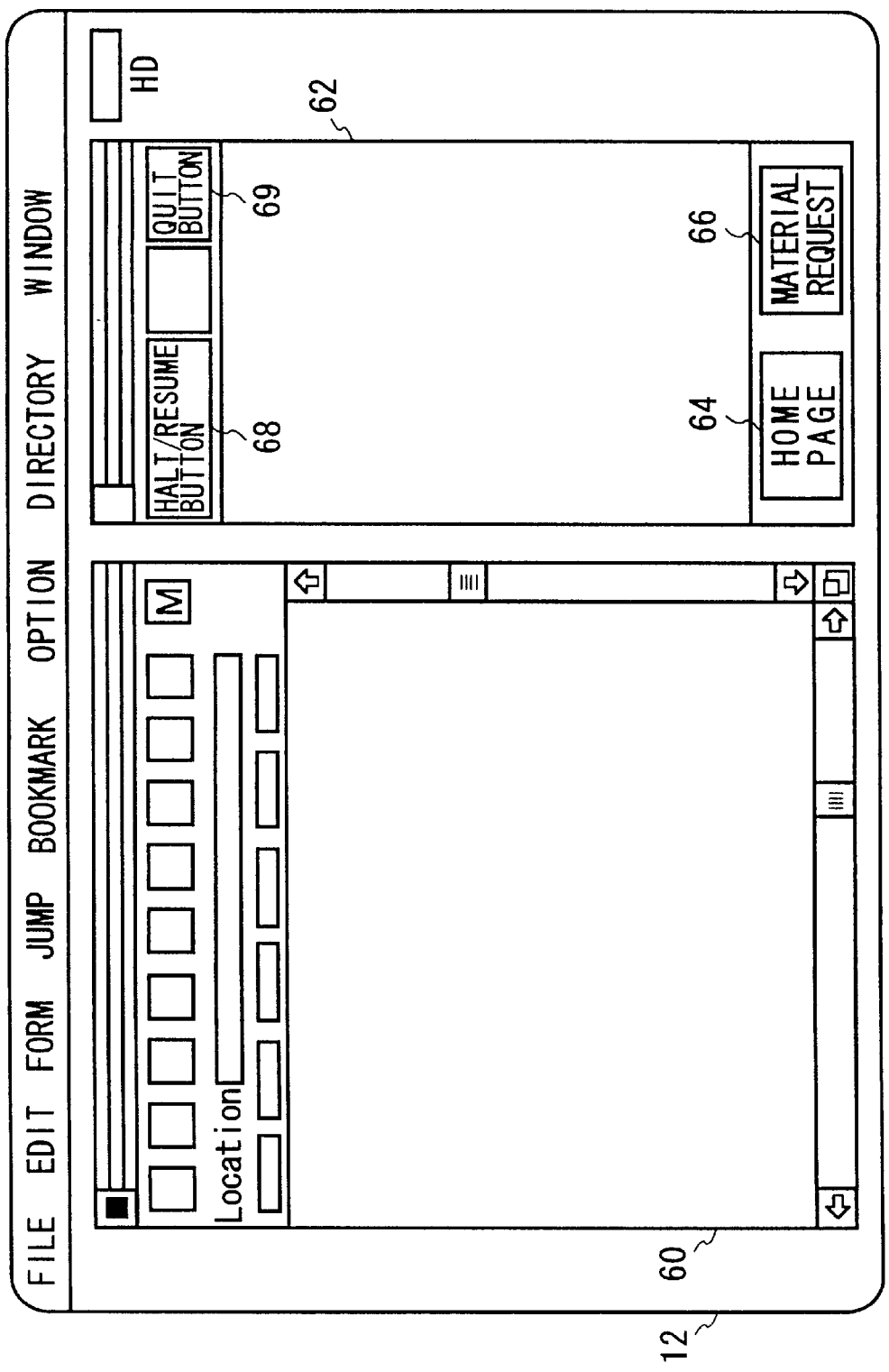
FIG. 4 illustrates a display screen on the display 12.

FIG. 4 is an example of the screen on the display 12 of FIG. 1. The window (browser window) 60 of the browser 74 and the window (message viewer window) 62 of the message viewer 76 are opened on the display 12. The browser window 60 displays the information received from Internet 32. The message viewer window 62 displays the message received from the message manager 24. The message viewer window 62 displays a new message once every predetermined time interval, for example, once every minute.

The message viewer window 62 has a home page button 64, a material request button 66, a halt/resume button 68, and a quit button 69. When the home page button 64 is selected, the browser window 60 displays the home page corresponding to the message in the message viewer window 62. When the material request button 66 is selected, the message manager 24 transfers informational materials concerning the goods advertised in the message displayed in the message viewer window 62. The message viewer window 62 displays these informational materials. Within the display of the message and the informational materials there is a button for ordering the displayed goods.

1.1.5 Connection Manager 23, Message Manager 24, and Host Computer 30

Figure 5:
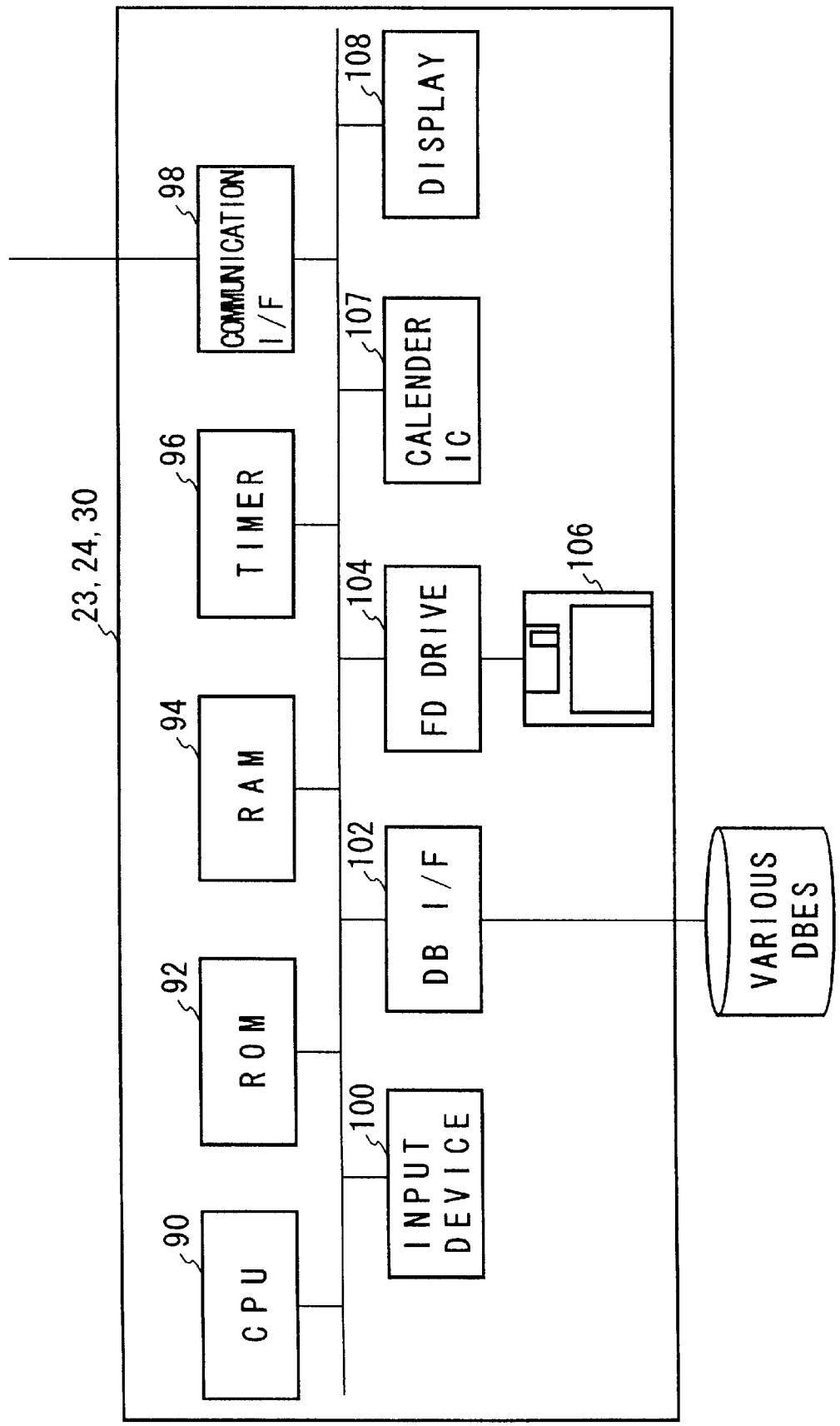
FIG. 5 is a block diagram of the hardware construction of the connection manager 23, the message manager 24, and the host computer 30.

FIG. 5 is a hardware block diagram of the connection manager 23, the message manager 24, and the host computer 30 of FIG. 1. The CPU 90 operates based on the program stored in the RAM 94 and the ROM 92. The timer 96 counts a predetermined time. The communication interface 98 processes inputs and outputs from the communication lines. The user inputs the data through the input device 100. The database interface 102 connects various databases comprising the hard disk drive. The floppy disk drive 104 reads data or programs from the floppy disk 106 and provides them to the CPU 90. The calendar IC provides the date and time to the CPU 90. The display 108 displays the communication status for the operator.

1.1.6 Message Distribution Apparatus 39

Figure 6:
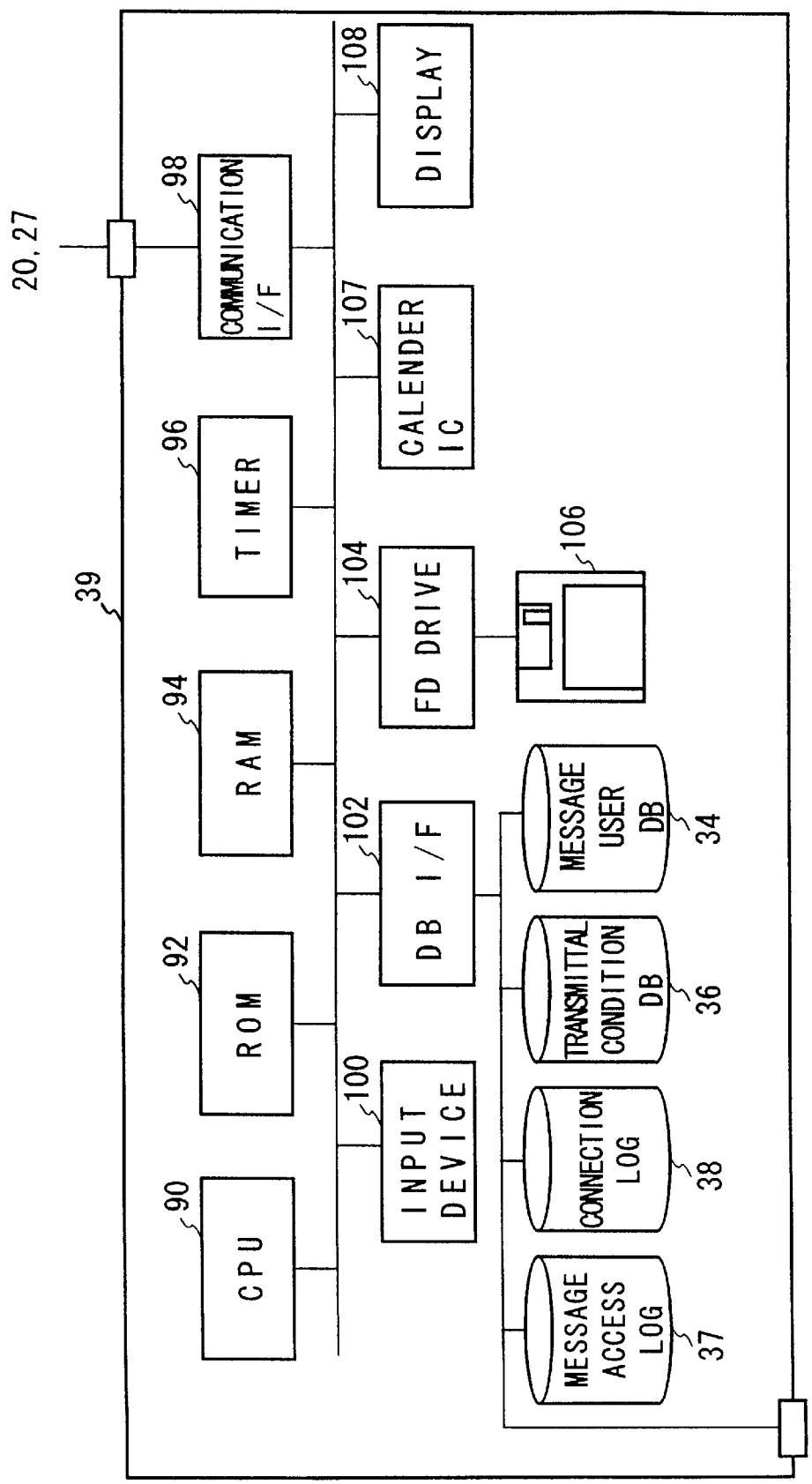
FIG. 6 shows the hardware construction of the message distribution apparatus 39.

FIG. 6 shows the construction of the message distribution apparatus 39 of FIG. 1. The explanations of the reference numerals already explained are eliminated because the same reference numerals are assigned to the corresponding elements. The message distribution apparatus 39 has a message user database 34 storing the message user information, a transmittal condition database 36 storing the transmittal conditions for each message, and a connection log 38 storing communication records. A first communication interface for connecting to the closed network 27 and a second communication interface for connecting to the information provider 20 may be employed, instead of the communication interface 98.

1.1.7 Message User Database 34

FIGS. 7 and 8 show the construction of the message user database 34 of FIG. 6. The message user database 34 stores the ID and password of each message user, Internet provider IDs for identifying the respective information providers 20, and a user ID (Internet provider's user ID) assigned to each user by an Internet provider and used when the user accesses Internet through that Internet provider. The message user database 34 also has, for each message display period, information about the user (user information) such as date of birth 312, sex 314, marital status 316, occupation 318, and address 320.

In FIG. 8, the message user database 34 further has the user's credit card number, credit card expiration date, name, and the last communication date. Each user is assigned a parameter whose value is determined by the number of times the message is displayed in the message viewer window 62. The message user database 34 stores parameters 336, 334, and 332 representing the number of times the message is displayed for the current month, the previous month, and the month before that, respectively.

For example, the user inputs his user information in terminal 10 when using message viewer 76 for the first time or when installing message viewer 76 in the terminal 10. The terminal 10 stores the input user information in the hard disk drive 50, and sends the user information to the message manager 24. The message manager 24 transmits the user information received from the user to the message distribution apparatus 39. The message distribution apparatus 39 stores the user information in the message user database 34. Age, occupation, marital status, income level and hobbies can also be stored as user information.

1.1.8 Transmittal Condition Database 36

FIGS. 9 and 10 explain the construction of the transmittal condition database 36. The transmittal condition database 36 stores the message URL which identifies each message and the corresponding communication conditions for each message. The transmittal condition database includes such information as the frequency of display for an individual user, the frequency of display for all users, the message display period, the age range of the users, the sex, marital status, occupation and address of an individual user, and the ID numbers of other messages which are closely related to the message.

In FIG. 10, every time a message is displayed in the message viewer window 62 of the user, the message provider of that message is charged a fee. Thus, each information provider 20 has a charge limit 210 and an absolute limit 220. The charge limit 210 stores the limit for each message displayed for each user. The absolute limit 220 stores the total charge limit for each message being provided to the all users of the information provider 20.

The charge limit 210 has a message unit price 212 which is charged for a message when the message is displayed for the information provider 20 user, a button unit fee 214 which is charged for the message when the button is clicked in the message, a term 216 which indicates a predetermined time period, a term limit 217 which is a limit of total charges for the period determined by the term 216, and a total limit 218 which is a limit of total charges for each message displayed to the users of the same information provider 20.

When receiving a request from the terminal 10, the message distribution apparatus 39 reads the user information from the message user database 34 and searches for a message from the transmittal condition database 36 using the user information. Then, the message distribution apparatus 39 sends the URL of the messages it has found to the terminal 10. Thus, the URL of messages suitable for each user (for example, advertisements for goods which are suitable for the user based on his characteristics and which are related to goods the user has already shown an interest in) can be transmitted to each terminal 10.

FIG. 11 shows an example of connection log 38. The connection log records, for each provider user ID, the provider ID, events, such as a logon or charge stop, and the date and time of occurrence of the events. While the user is not charged for accessing the information provider, a message is displayed on the terminal 10, and the message distributor charges the message fee to the message provider. The user connection fee is paid to Internet provider by the message distribution apparatus 39. In other words, users of Internet provider can access Internet for free on the condition of recognizing messages. For example, FIG. 11 indicates that the charge on the user XXX, who uses an Internet provider, was stopped after logon. The message distribution apparatus 39 determines the period of time between logon and charge stop based on the connection log 38, and pays the connection fee corresponding to that time period to Internet provider.

FIG. 12 shows the structure of the message access log 37. The message access log 37 records the user's operations to messages. The message distribution apparatus 39 stores the message user ID of the user who displays the message, the message ID of the displayed message, the date and time when the message is operated, and the operation type. When the operation is to display a message, operation type "1" is stored. If the operation is to display a home page linked to that message, then operation type "2" is stored. If the operation is to request materials, operation type "3" is stored. The message distribution apparatus 39 can charge the message fee for displaying the message on the message viewer window 62 to the message provider.

1.2 Connection Operation 1.2.1 Connection Sequence

Figure 13:
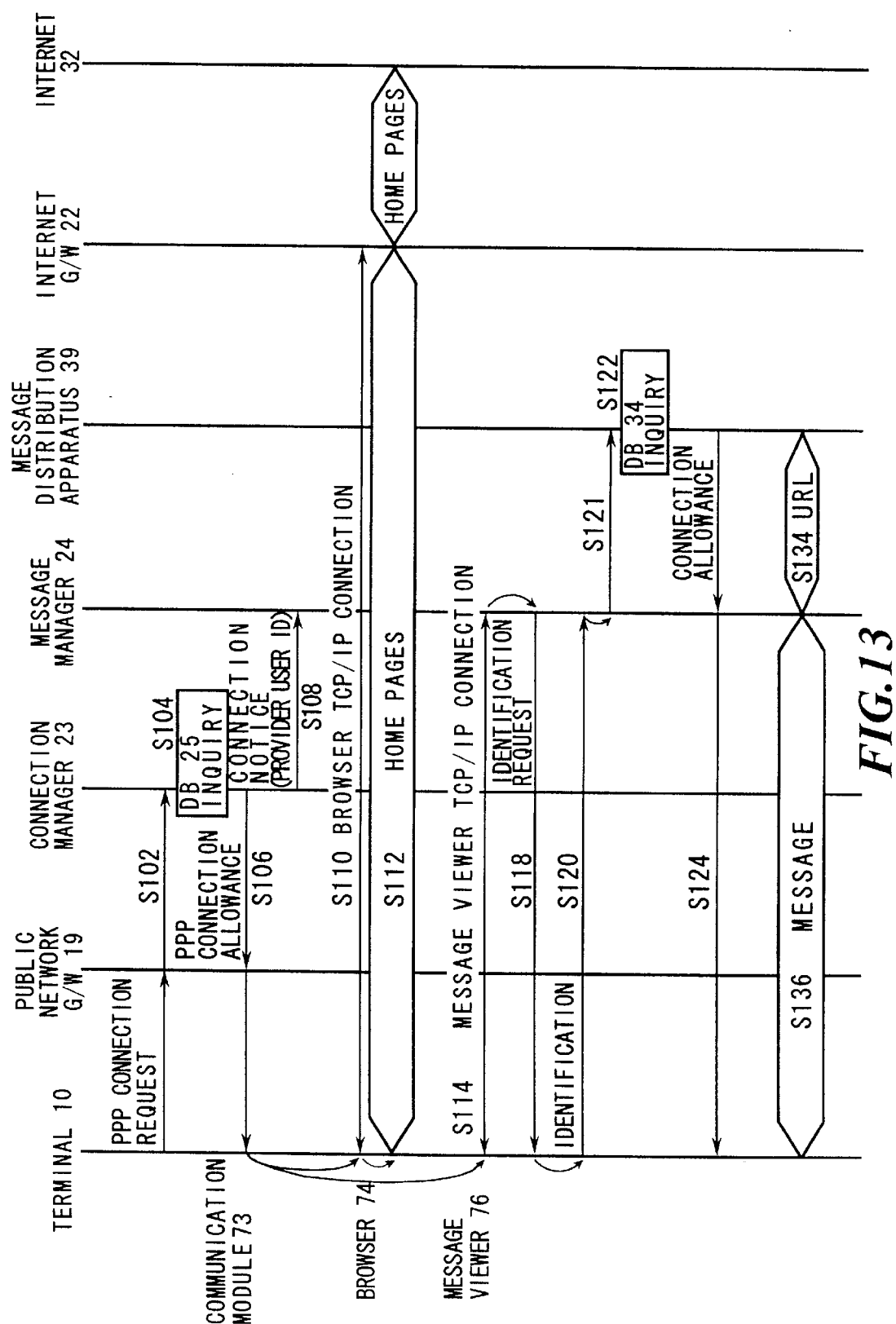
FIG. 13 shows a connection sequence among the terminal 10, Internet 32, and the message distribution apparatus 39.

In reference to FIG. 13, the connection sequences among the terminal 10, the connection manager 23, the message manager 24, the message distribution apparatus 39, Internet gateway 22, and Internet 32 are explained. When the communication module 73 of the terminal 10 requests a PPP connection (S102), the connection manager 23 inquires of the provider user database 25 whether the received provider user ID and the provider user password have been already registered (S104).

If the user ID and the password have been registered, the connection manager 23 sends a PPP connection allowance to the terminal 10 (S106) and informs the message manager 24 of the provider user ID (S108). If the PPP connection is allowed, the browser 74 of the terminal 10 connects to Internet gateway 22 by a TCP/IP connection (S110), and communicates with Internet 32 through Internet gateway 22 (S112). The connection module 78 of the message viewer 76 also connects to the message manager 24 by a TCP/IP connection (S114). Then, the message manager 24 requests approval information (identification) from the message viewer 76 of the terminal 10 (S118).

Upon receiving the request for approval information (identification), the connection module 78 of the message viewer 76 sends the message user ID and the password as the approval information to the message manager 24 (S120). The message manager 24 sends the provider user ID received from the connection manager 23, the message user ID and the password received from the message viewer 76, and the provider ID of the information provider 20 to the message distribution apparatus 39 (S121). Then, the message distribution apparatus 39 determines whether the received message user ID and the password are stored in the message user database 34 (S122). If the message user ID and the password are stored, the message distribution apparatus 39 sends the connection allowance to the message viewer 76 (S124).

Since separate data links are established between the browser 74 and Internet 32, and between the message viewer 76 and the message manager 24, each link can communicate independently. The communication method between the browser 74 and Internet 32 is known. Thus, the explanation of this is not given here. The message viewer 76 requests the message URL periodically from the message distribution apparatus 39 using the timer 46 (S134). When the message viewer 76 receives the message URL searched by the message distribution apparatus 39, the message viewer 76 requests the message corresponding to the message URL from the message manager 24 (S136).

The message manager 24 searches for the corresponding message from the message database 26, and sends the message to the message viewer 76 (S136). The transmitted message includes, for example, advertisements of goods. Users can order the goods advertised. The communication between Internet 32 and the browser 74 is inexpensive but unreliable because the communication is made through multiple computers within Internet. On the other hand, the communication between the message viewer 76, the message manager 24, and the message distribution apparatus 39 is highly reliable because of the dedicated line.

1.2.2 Connection Operation of Terminal 10

Figure 14:
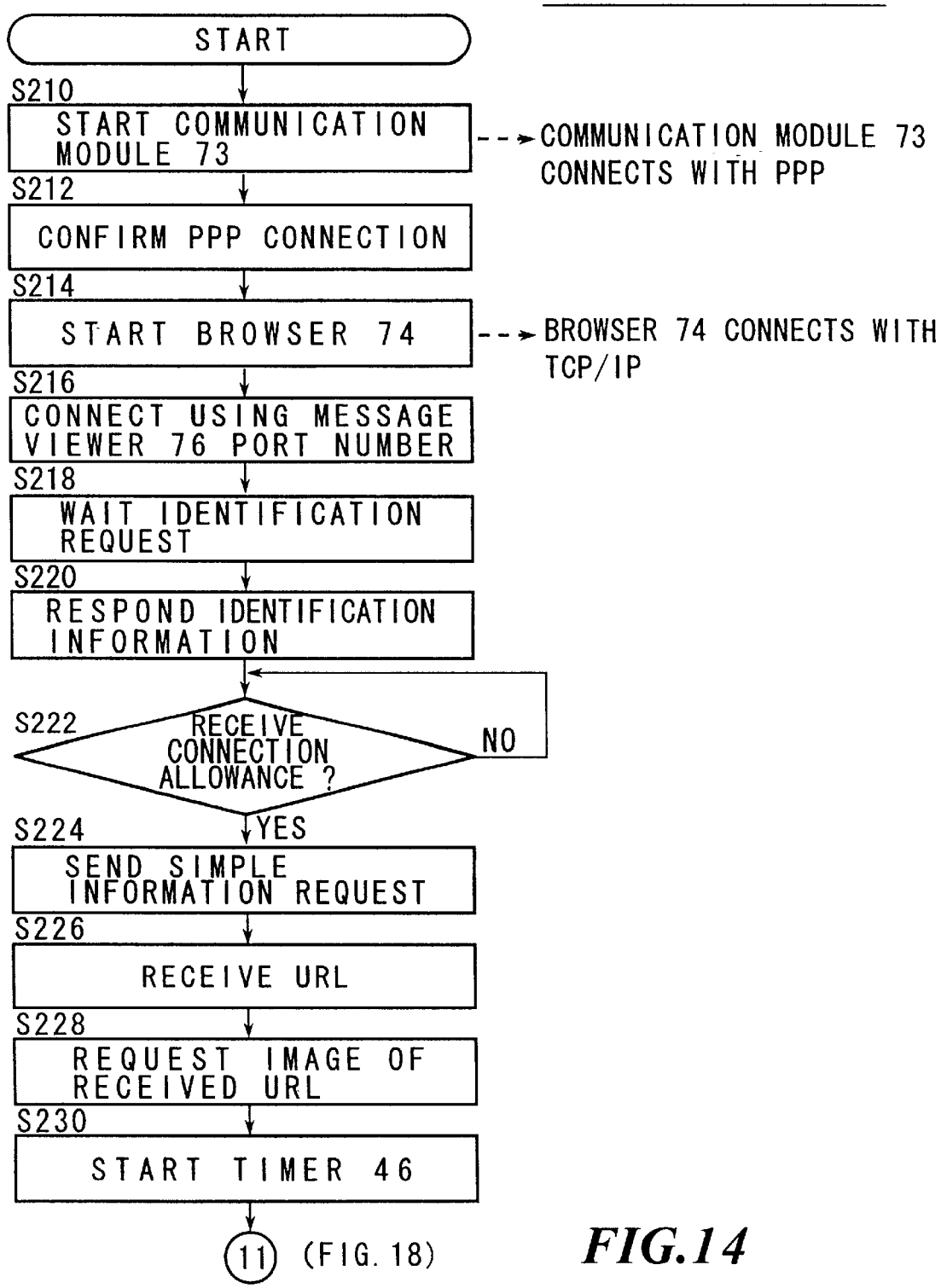
FIG. 14 is a flow chart of the connection process of the terminal 10, which is performed by the connection module 78.

FIG. 14 is a flow chart showing the operation of the terminal 10 in the connection sequence shown in FIG. 13. The connection module 78 of the message viewer 76 performs this process. First, the connection module 78 starts the communication module 73 (S210) Then, the communication module 73 makes a PPP connection to the public network gateway 19 by using the provider user ID and the provider user password (S210). After the PPP connection is confirmed (S212), the connection module 78 starts the browser 74 (S214). Then, the browser 74 makes a TCP/IP connection to Internet gateway 22. Then, the connection module 78 makes a TCP/IP connection to the message manager 24 by using an independent TCP/IP port number of the message viewer 76 (S216)

The browser 74 and the message viewer 76 can communicate with Internet gateway 22 and the message database 26 respectively and independently, by theoretically independent links using separate TCP/IP port numbers. Thus, the message viewer 76 can display messages without the terminal losing the function of the existing browser. Afterwards, when the message manager 24 requests confirmation (S218), the message user ID and the message user password are sent as the confirmation (S220).

If the message manager 24 allows the connection (S222), a simple information request is sent out (S224). The simple information request is a signal requesting the terminal 10 to send a message quickly. When the simple information request is received, the message manager 24 selects an appropriate message URL from the message database 26 and sends it to the terminal 10. The terminal 10 receives the URL (S226) and requests the corresponding image (S228). The terminal 10 stores the received image in the image buffer provided in the RAM 44 of the terminal 10.

In the case of a simple information request, messages corresponding to the user data stored in the message user database 34 are not searched for. Therefore, the time required for the first message display is shortened, and the period in which no image is displayed in the message viewer window is shortened. However, in other embodiments, messages may be searched for based on a part of the user data when a simple information request is received. Messages can be searched for quickly by employing less strict message search conditions.

Next, the connection module 78 activates the timer 46 (S230). The timer 46 shows the time at which a new message is to be displayed. Then, the connection module processes the inputs from the user and the public network 17 by starting the input processing unit 82.

1.2.3 Connection Operation of the Connection Manager 23

Figure 15:
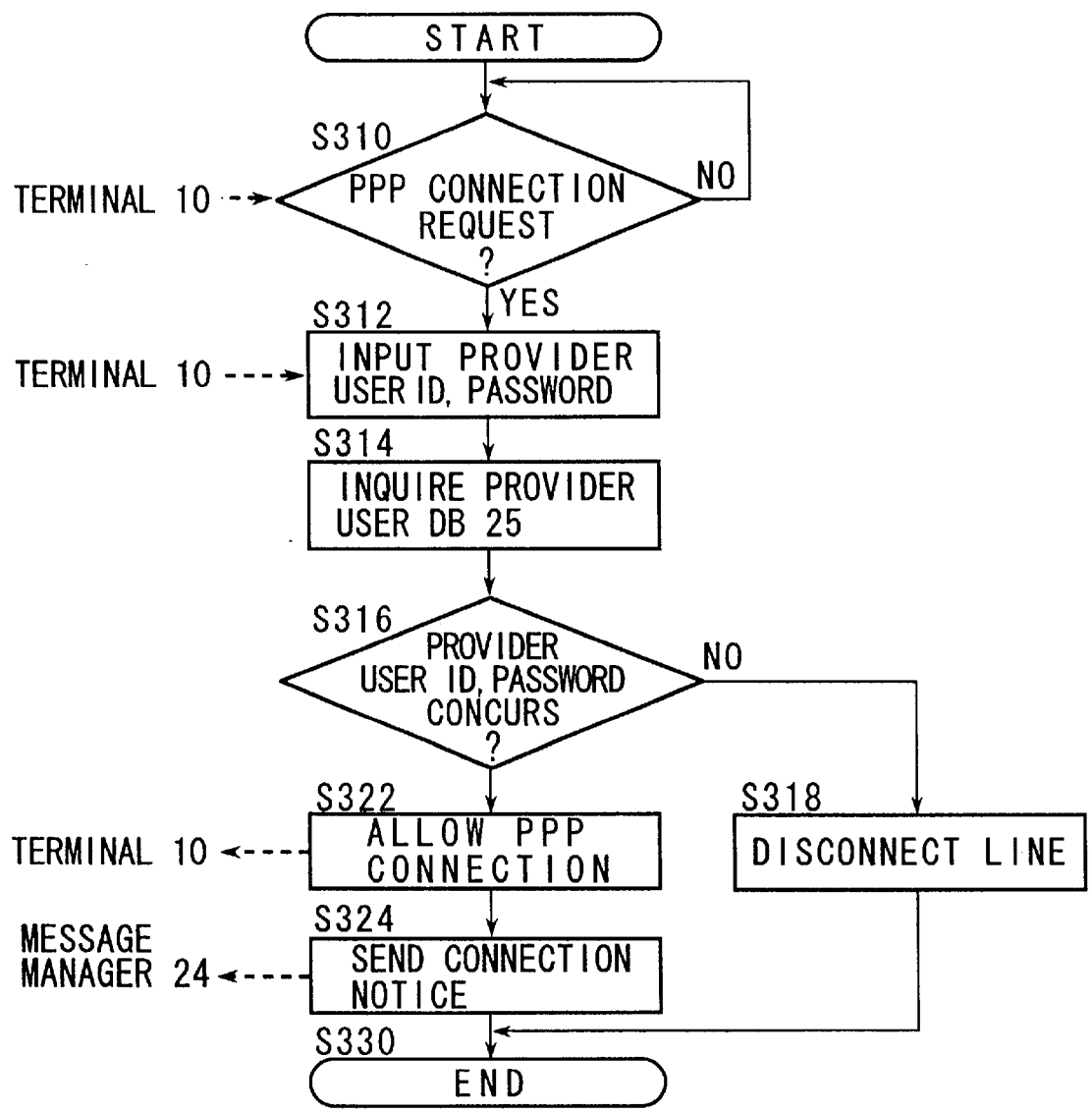
FIG. 15 is a flow chart of the connection process of the connection manager 23.

FIG. 15 is a flow chart of the connection manager 23 in the connection sequence shown in FIG. 13. When a PPP connection is requested from the terminal 10 through the public network gateway 19 (S310), the connection manager 23 requests the provider user ID and the password from the terminal 10 and receives them (S312). Then, the connection manager 23 inquires of the provider user database 25 whether the provider user ID and the password, which have been received, are registered (S314).

The provider user database 25 stores each provider user ID and corresponding provider user password. When the provider user ID and the password received are not registered in the provider user database 25, the connection manager 23 disconnects (S318) and finishes the process (S330). When the provider user ID and the password are registered in the provider user database 25, the connection manager 23 allows the PPP connection to the terminal 10 (S322) and sends the connection allowance to the message manager 24 (S324), and then finishes the process (S330).

1.2.4 Connection Operation of the Message Manager 24

Figure 16:
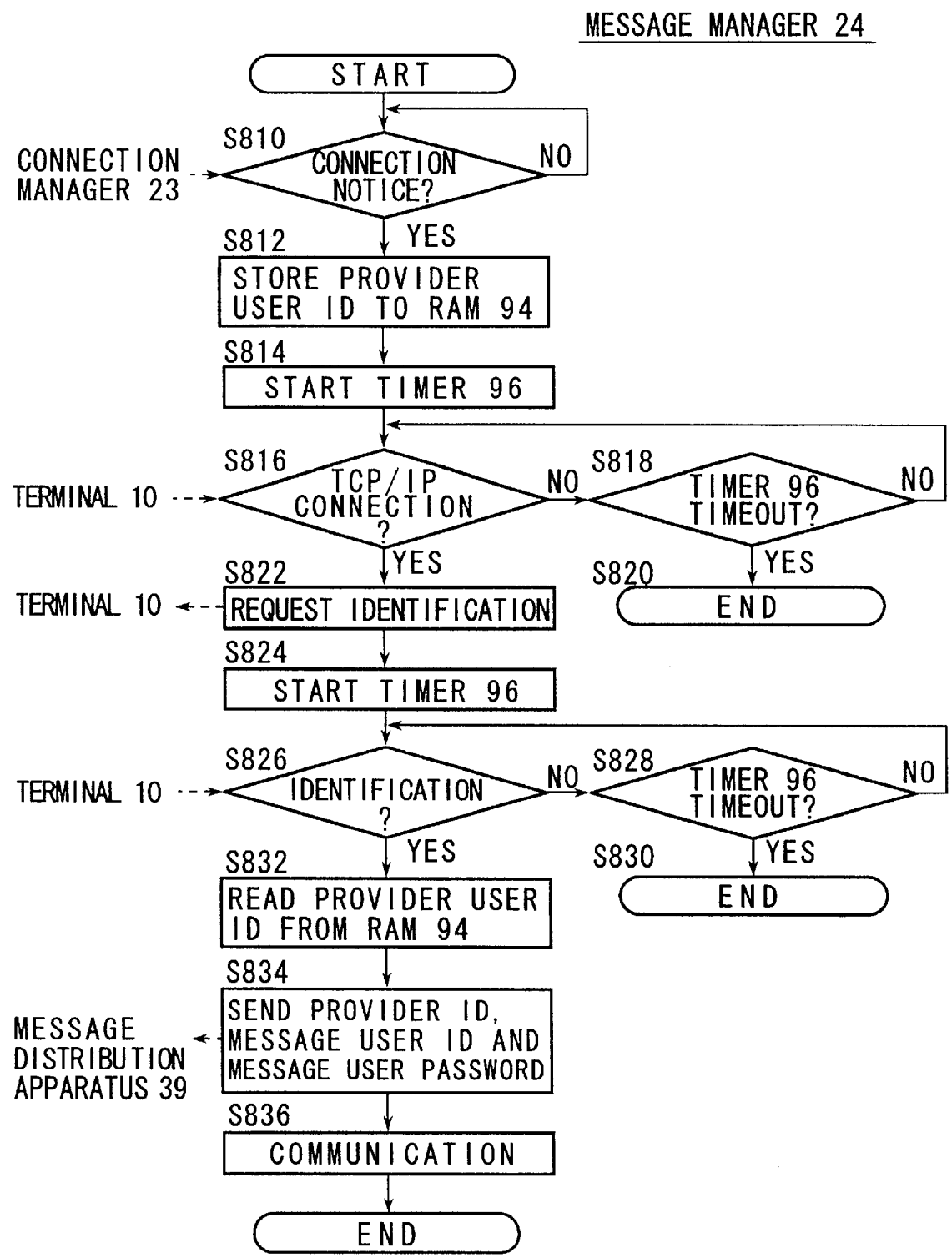
FIG. 16 is a flow chart of the connection process of the message manager 24.

FIG. 16 is a flow chart of the operation of the message manager 24 in the connection sequence shown in FIG. 13. When the connection allowance is received from the connection manager 23, the message manager 24 stores the received provider ID in the RAM 94 (S812). Then the timer 96 starts (S814) and the message manager 24 determines whether a TCP/IP connection is established (S816). If a TCP/IP connection is not established, the message manager 24 waits (S816, S818). The process ends if the timer 96 runs out (S818) while waiting (S820).

When a TCP/IP connection is established, the message manager 24 requests approval information from the message viewer 76 (S822). The timer 96 is reset to start a new count (S824). If the timer 96 runs out before the approval information is received (S828), the process ends (S830). When the approval information is received (S826), the message manager 24 reads the provider user ID from the RAM 94 and sends it to the message distribution apparatus 39 along with the provider ID which identifies the provider, the message user ID and the message user password received from the message viewer 76 (S834). Then, the message manager 24 communicates with the message viewer 76 and the message distribution apparatus 39 (S836).

1.2.5 Connection Operation of the Message Distribution Apparatus 39

Figure 17:
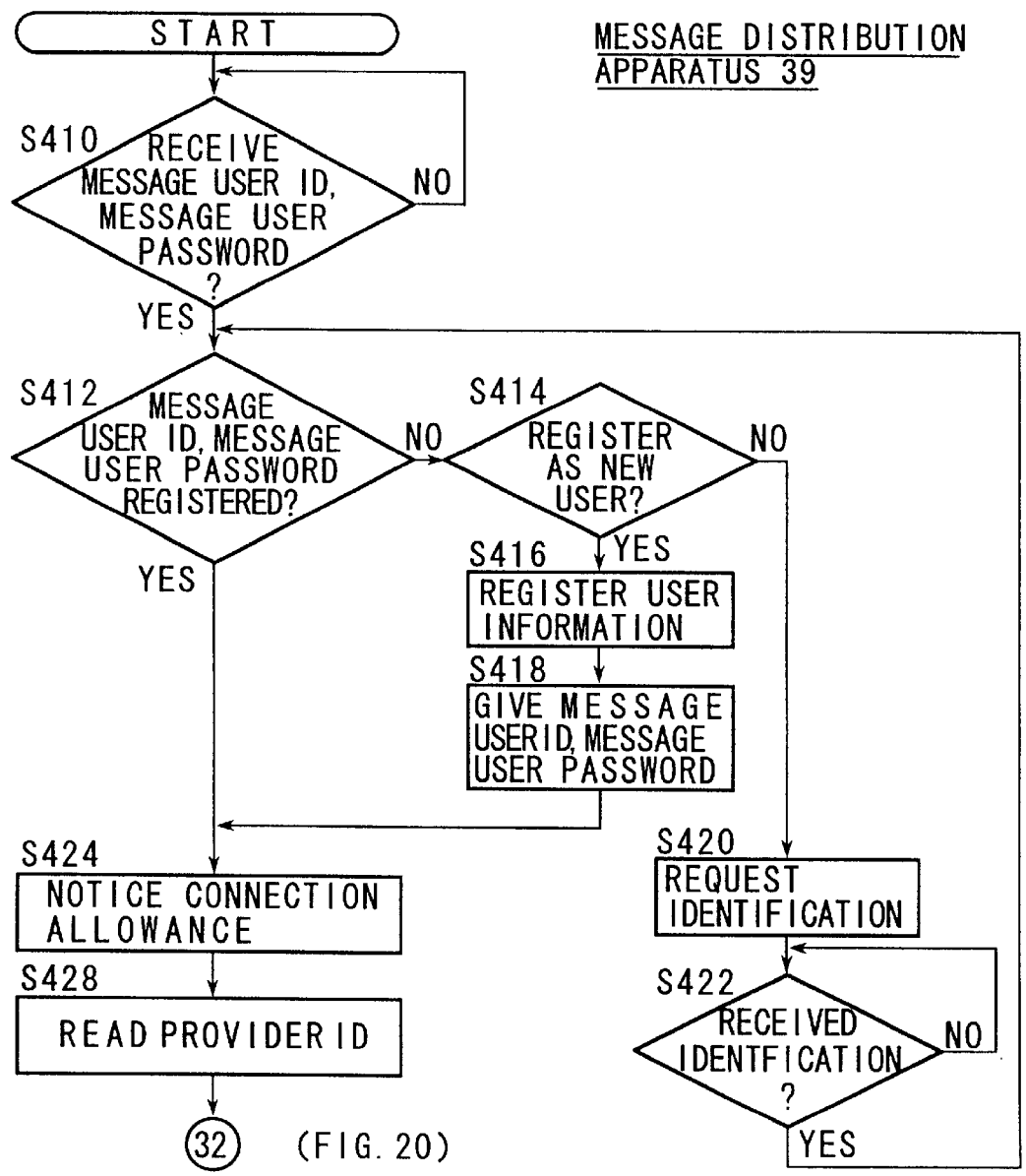
FIG. 17 is a flow chart of the connection process of the message distribution apparatus 39.

FIG. 17 is a flow chart showing the operation of the message distribution apparatus 39 in the connection sequence shown in FIG. 13. When the message distribution apparatus 39 receives the message user ID and the message user password from the message manager 24 (S410), the message distribution apparatus 39 asks the message user database 34 whether the message user ID and the password have been registered (S412). If the message user ID and the password have not been registered, the message distribution apparatus 39 asks the message viewer 76 whether to register a new user is to be registered (S414). To register a new user, the user information is received through the message viewer 76 and stored in the message user database 34 (S416). The message user ID and message user password are given to the new user (S418).

When a new user is not to be registered (S414), the message distribution apparatus 39 requests approval information, such as the message user ID and the password, from the message viewer 76 again (S420), waits until the approval information is received (S422), then returns to S412. If the message user ID and the password are approved (S422), a connection allowance is sent out (S424). Then the provider ID received from the message manager 24 is read (S428). The message user ID and the provider user ID are set independently. Thus, even when the message user has contracts with multiple providers, the information provider 20 which the user is currently using can be distinguished. The connection manager 23 charges the information provider 20 indicated by the provider user ID for the message.

Figure 18:
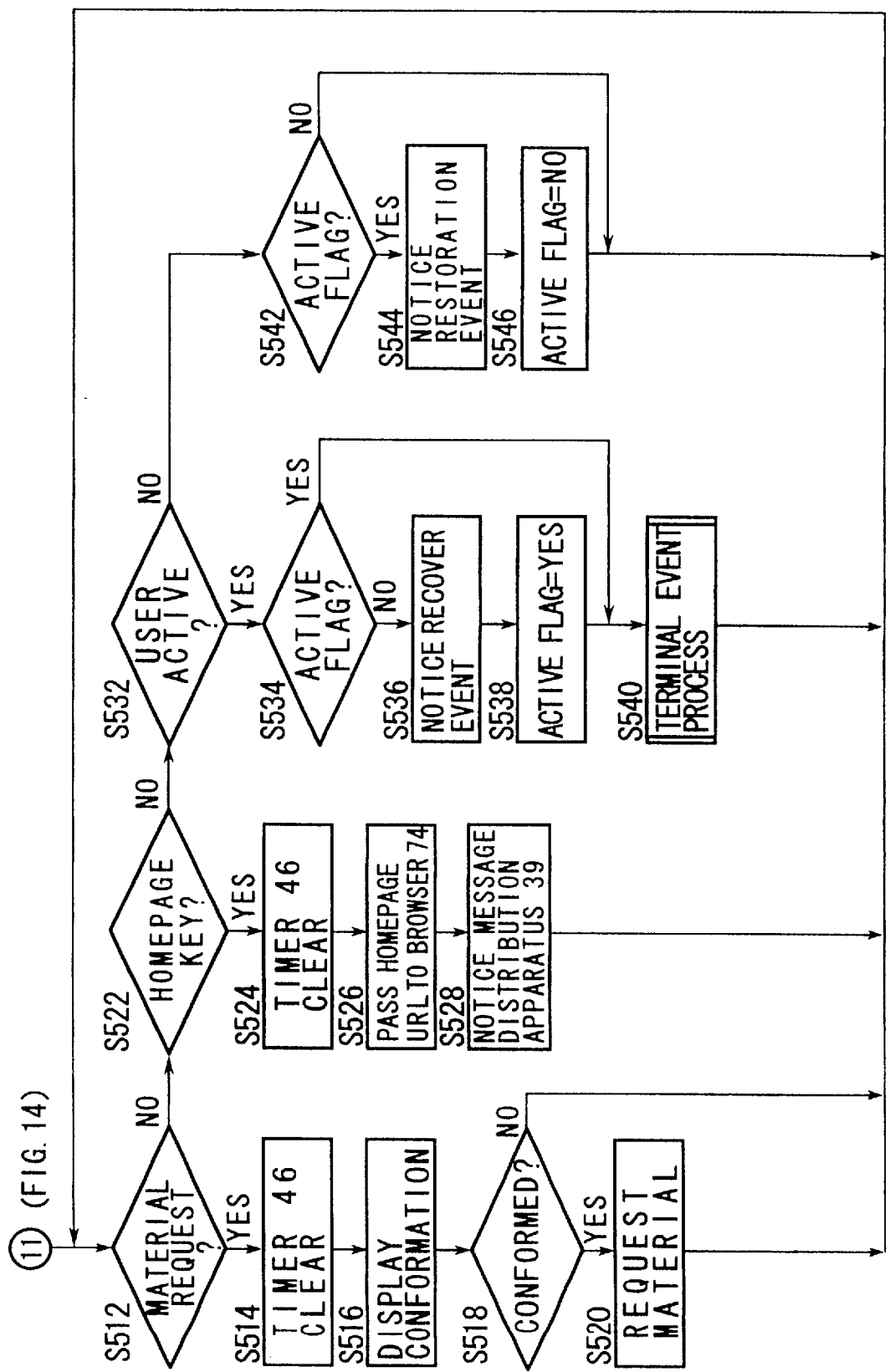
FIG. 18 is a flow chart of the input process of the terminal 10 after the connection sequence.

1.3 Operations after Connection 1.3.1 Operations of Terminal 10 after Connection:

FIG. 18 shows the operation flow chart of the input process of the terminal 10 after the connection sequence. The input-processing unit 82 of the message viewer 76 executes this operation. If the home page button or the material request button is selected (S512), the timer 46 is cleared (S514). This prevents the message from being changed during the user's operation. The terminal 10 displays the user's address in the message viewer window to obtain the user's confirmation (S516). When the address is confirmed (S518), the terminal 10 directs the message distribution apparatus 39 to mail the material to the user's address (S520).

If the material request button is not selected at S512, it is determined whether the home page button has been selected (S522). If the home page button has been selected, the timer 46 is cleared (S524), and the URL of the home page is transferred to the browser 74 (S526). The fact that the home page button has been selected is transmitted to the message distribution apparatus 39.

If it is determined at S522 that the home page button has not been selected, an inquiry is sent to the operations system about whether the user is active (S532). If there is no action from the user for a predetermined period of time, the operation system determines that the user is not active. If there is action from the user within the predetermined period of time, the operation system determines that the user is active. Alternatively, if any operation, such as scrolling, occurs, or any response is made to the displayed message within the predetermined period of time, it may be determined that the user is active.

The RAM 44 has an activity flag, which indicates whether the user is active or inactive. If the user is active (S532), and if the activity flag is still indicating NO ("0") (S534), this means that the user's state has changed from inactive to active. In this case, a restoration event notice is sent to the message distribution apparatus 39 (S536) to change the activity flag to YES ("1") (S538).

If the user is active (9532), and if the activity flag is indicating YES (S534), this means that the user's state has remained active without change. In this case, no restoration event notice is issued (S536). If the user is active at S532, terminal event processing is executed, regardless of the state of the activity flag (S540).

If the user is inactive (S532), it is detected whether the user's state has changed (S542). If the user's state has changed, a restoration event notice is transmitted to the message distribution apparatus 39 (S544) to change the activity flag to NO (S546). If the user's state has not changed, the activity flag is not changed. If the user is inactive (S532), terminal event processing is not executed (S540).

1.3.2 Event Process of Terminal 10

Figure 19:
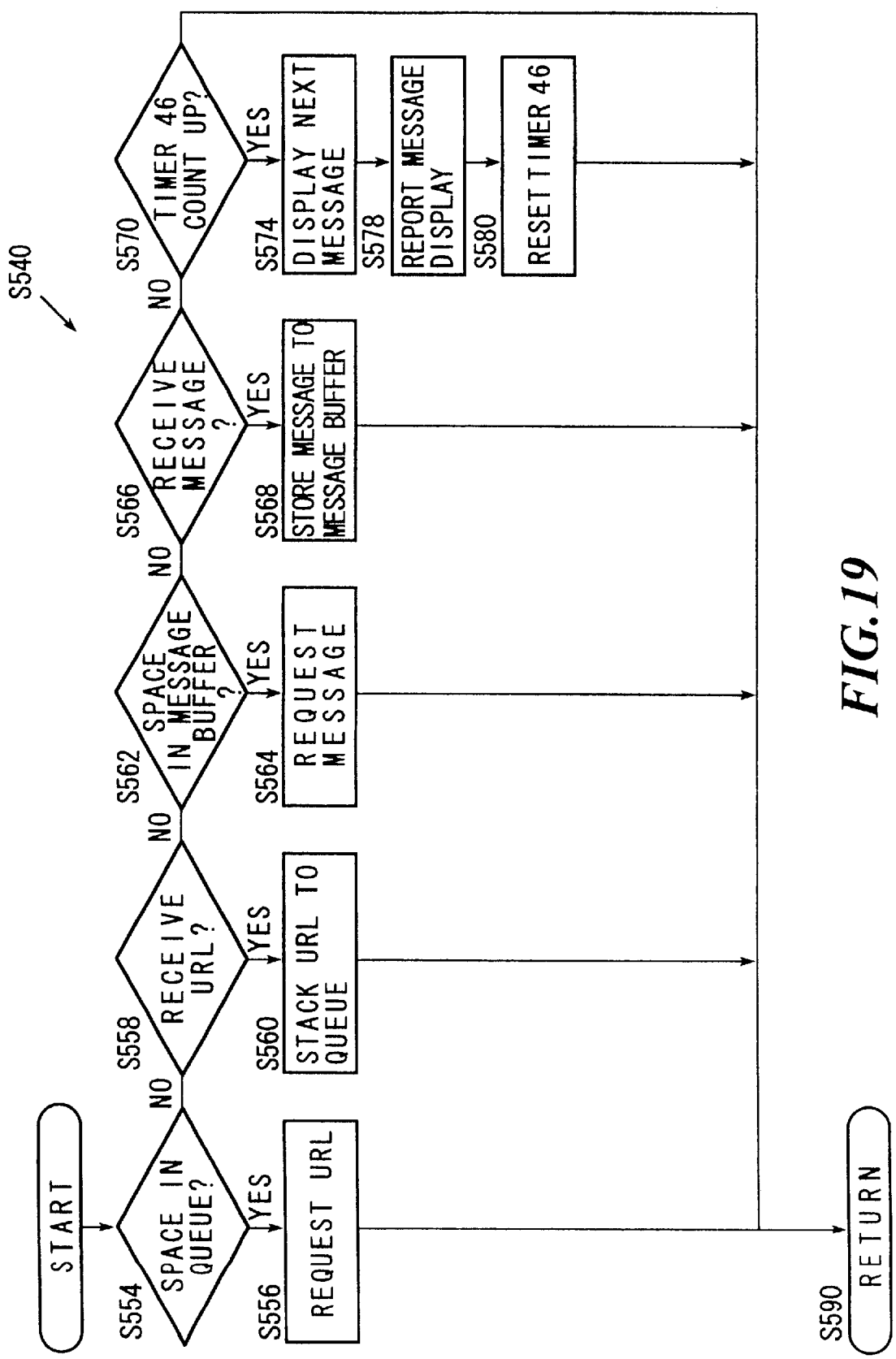
FIG. 19 is a flow chart of the event process of the terminal 10 after the connection sequence.

FIG. 19 shows the details of the event processing (S540) of the terminal 10. The event process module 84 of the message viewer 76 performs this process. If there are more than a predetermined number of empty spaces in the queue (S554), a URL request is transmitted (S556). Upon receiving the URL (S558), the terminal 10 stacks the URL in the queue (S560). If there is an empty space in the message buffer (S562), the terminal 10 requests the message manager 24 to send the message, using the URL which has been stacked at the head of the queue 84 (S564). Upon receiving the message (S566), the terminal 10 stores the message in the message buffer (S588).

When the timer 46 runs out (S570), the message which was received earliest in the image buffer is displayed (S574). The terminal 10 transmits data indicating the URL of the displayed message and the fact that the message was displayed, to the message distribution apparatus 39 (S578), and resets the timer 46 (S580). The operation returns to S512 of FIG. 18 to process the input (S590) If the user is inactive, the terminal event processing (S540) is not executed.

When the user is inactive, no request for a URL is transmitted to the message distribution apparatus 39, nor is a request for a message transmitted to the message manager 24. Furthermore, when the user is inactive, any received URL or message is not stored in the memory. Even when a message has been received, the message is not displayed. Therefore, when the user is inactive, no notice that a message has been displayed is transmitted to the message distribution apparatus 39.

1.3.3 Operation of Message Distribution apparatus 39 after Connection

Figure 20:
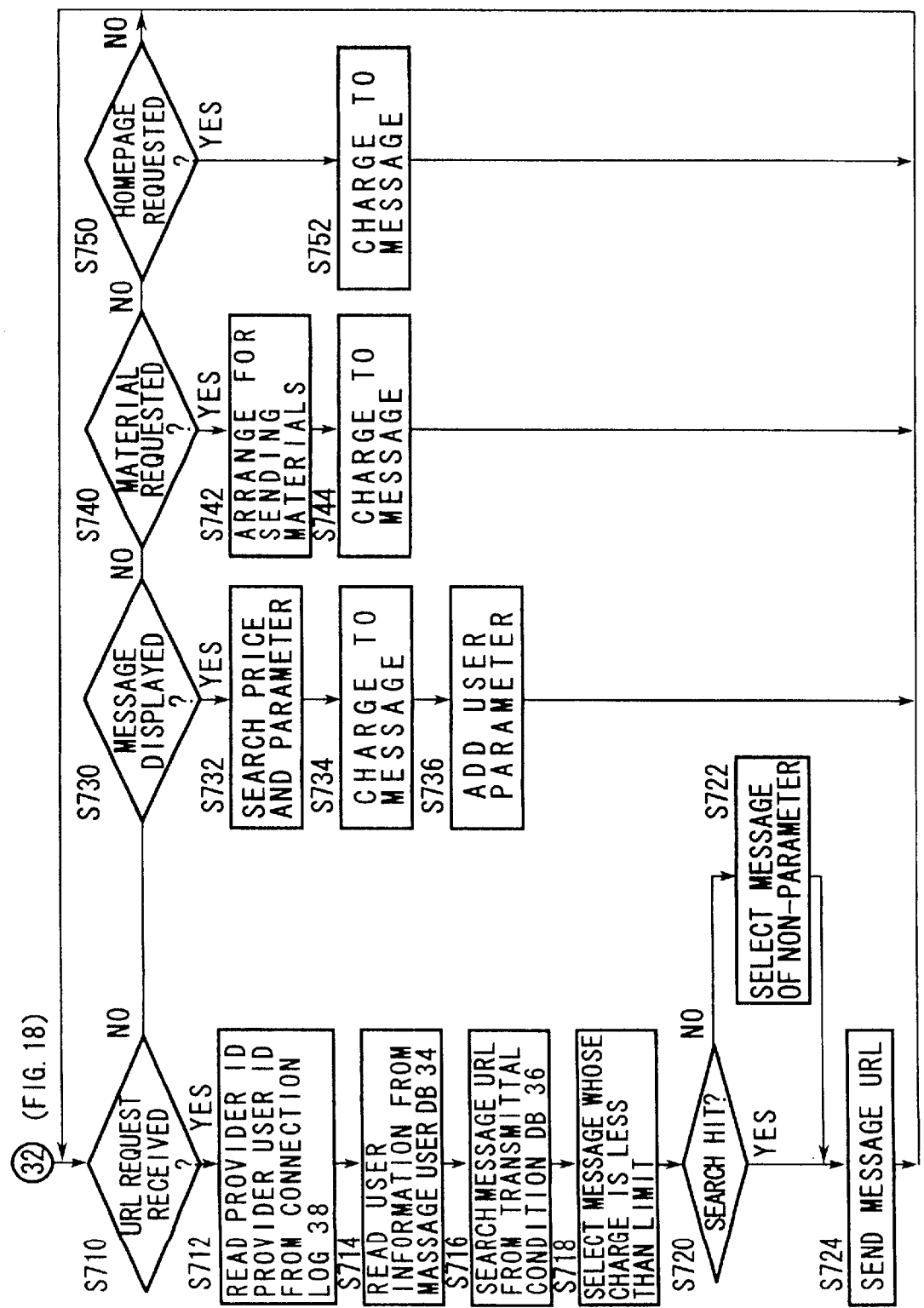
FIG. 20 is a flow chart of the log statistic process of the message distribution apparatus 39.

FIG. 20 is a flowchart showing the operations of the message distribution apparatus 39 after the connection sequence. Upon receiving a URL request from the terminal 10 (S710), the message distribution apparatus 39 reads the provider ID and the provider user ID of the user who transmitted the URL out of the connection log 38 (S712). Next, the message distribution apparatus 39 searches for and reads out the user information from the message user database 34 based on the provider user ID (S714).

Then, the message distribution apparatus 39 searches the transmittal condition database 36 for message URLs based on the user information (S716). In this manner, messages are retrieved for each user that are suitable to the user based on his characteristics as indicated by his user information. If other messages are designated in the "relevant message" field in the transmittal condition database 36, the provider user IDs of those users who read the home page associated with the message or who requested the material of the message, is readout from the message user file.

Then, appropriate messages are searched for on the condition that the provider user ID read out in S712 is registered in the message user file. Therefore, messages are efficiently transmitted to precisely those users whose characteristics are appropriate for the messages. Of the retrieved messages, those messages for which the amount charged to the information provider 20 for the current term does not exceed the term limit 217, the total amount charged to the information provider 20 does not exceed the total limit 218, and the sum of the amounts charged to all the information providers 20 does not exceed the absolute limit 220, are selected (S718).

If the URL search makes a hit (S720), the message URL is transmitted to the terminal 10 (S724). If the search does not make a hit (S720), a message URL whose parameter value is "0" is selected from the message data transmittal condition database 36 (S722), which is then transmitted to the terminal 10 (S724). When the message distribution apparatus 39 receives a message display report from the terminal 10 (S730), the message distribution apparatus 39 searches for that message, based on the message URL contained in the message display report (S732), and charges the message unit price 212 for that message (S734). The message distribution apparatus 39 further reads out the parameter value of the message to add it to the user's parameter 336 for the current month (S736).

When a material request is sent from the message viewer 76 (S740), the message distribution apparatus 39 instructs the message provider to send the material to the user (S742). The message distribution apparatus 39 also reads the button unit charge 214 for that message out of the transmittal condition database 36 to charge for the message (S744).

When a home page request is sent from the message viewer 76 (S750), the message distribution apparatus 39 reads the button unit charge 214 for that message out of the transmittal condition database 36 to charge for the message (S752). Every time the user operates a button within the message viewer window to request material or open a home page, the message provider is charged. Alternatively, button unit charging rates for material requests and home page displays may be established in the transmittal condition database 36, and the amount corresponding to the selected button may be charged to the message provider.

1.4 Usage of Parameters 332, 334, and 336

Figure 21:
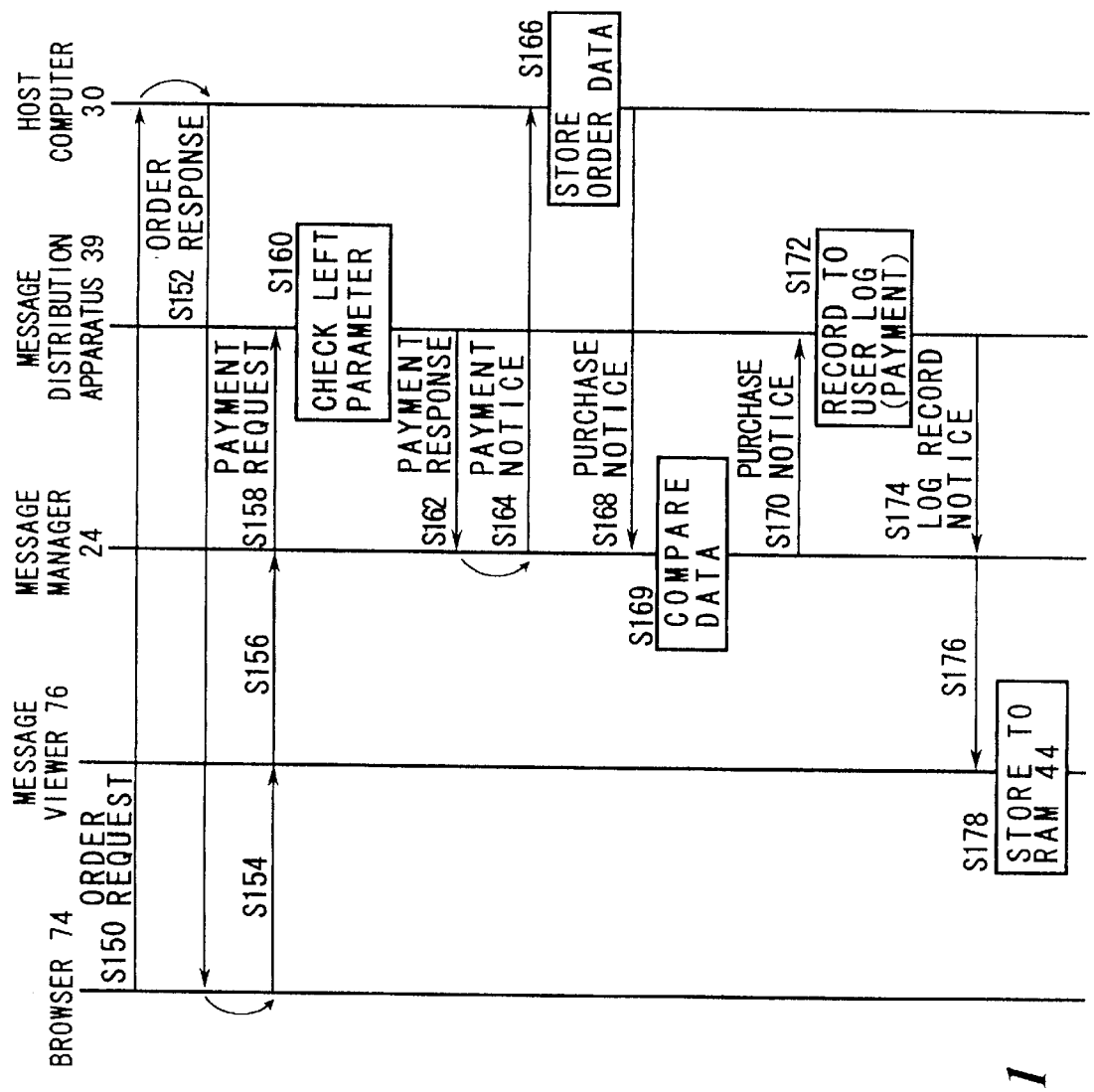
FIG. 21 shows a sequence of purchasing goods using parameters assigned to users.

FIG. 21 shows how to use the parameters 332, 334 and 336 assigned to the user. A parameter is assigned to each user. The user can increase the value of the parameter every time he displays the message on the display screen, and can make payment for goods on the host computer 30 using the parameter. The user orders goods from the host computer 30 on Internet 32 through the browser 74 (S150). Examples of such goods include image data, document data and sound data which are to be delivered on-line, and products which are to be delivered off-line, for example, by mail. The user may also purchase a subscription to a magazine, etc. In response to an order request from the user (S150), the host computer 30 sends back an order receipt response (S152).

The order receipt response (S152) requires the message viewer 76 as a helper application device. The order receipt response received at the message viewer 76 (S154) is transferred to the message manager 24 (S156). Then, the message manager 24 requests the message distribution apparatus 39 to pay for the order (S158). The message distribution apparatus 39 checks the remaining value of the user's parameter based on the user ID (S160).

If the value of the user's parameter is sufficient to pay for the goods, the message distribution apparatus 39 transmits a payment acceptance response to the message manager 24 (S162) The message manager 24 then sends ordering data to the host computer 30 (S164). The host computer 30 stores the ordering data in the RAM 94 to be used for the process of transmitting or mailing the goods (S166). The host computer 30 transmits a purchase notice to the message manager 24 (S168).

The message manager 24 compares the ordering data and the payment amount which were contained in the order receipt response received at S156 with the ordering data and the payment amount which were sent from the host computer 30 at S168, to determine whether they are in agreement with each other (S169). If they match, the message manager 24 determines that the ordering process has been appropriately executed, and transmits the purchase notice to the message distribution apparatus 39 (S170). Then, the message distribution apparatus 39 subtracts the amount necessary to pay for the goods from the value of the user's parameters, in the order of the parameter 332 (of two months prior), 334 (of the prior month), and 336 (of the current month) (S170). The message distribution apparatus 39 also records the requirement for payment in the user's log (S172).

If the data do not match at S169, the message manager 24 determines that there is an error in the order receipt response of S156, and transmits a specification of the goods ordered and the payment amount received at S168 to the message viewer 76. If the message manager 24 receives a confirmation of the goods ordered and the payment amount from the message viewer 76, the message manager 24 transmits a purchase notice to the message distribution apparatus 39 (S170). If the message manager 24 does not receive a confirmation, the message manager 24 instructs the host computer 30 to cancel the order.

Upon receiving a purchase notice from the message manager 24 (S170), the message distribution apparatus 39 records the goods and the price in the user's log to execute the payment (S172). Then, the message distribution apparatus 39 notifies the message manager 24 of the completion of recording in the log (S174). The message manager 24 further notifies the message viewer 76 that the purchase of the goods has been recorded in the log (S176). The message viewer 76 records the list of the purchased goods in the RAM 44 and in the hard disk drive 50.

When the user wishes to check the goods that he has already purchased, the message viewer 76 reads out the list of the goods from the hard disk drive 50 and displays the list on the display 12. If the user selects goods, which can be delivered on-line, the message viewer 76 checks whether the goods have already been stored in the hard disk drive 50. If the goods are in the hard disk drive 50, the message viewer 76 reads out the goods to output. If the goods have not been stored in the hard disk drive 50 yet, the message viewer 76 downloads the goods from the host computer 30 through the browser 74 to store them in the hard disk drive 50, and at the same time, the message viewer 76 outputs the data on the display 12.

When the host computer 30 receives a request for downloading the goods, for which a purchase notice was issued at S166, the host computer 30 transmits the goods, for example, image data, sound data, text data, etc. to the message viewer 76. In the preferred embodiment, if the value of the user's parameters 332, 334, 336 is sufficient, the user can purchase goods from the host computer 30. Since the value of the parameter is increased by displaying the message on the message viewer 76, or by selecting a button in the message viewer window, the user can obtain goods from the host computer 30 for free by having the message frequently displayed on the message viewer 76 or by operating a button within the message viewer window.

If the value of the user parameters is not sufficient for purchasing the desired goods, the message distribution apparatus 39 informs the message viewer 76 that the balance is to be charged to the user's credit card account. If an approval is sent from the message viewer 76, the message distribution apparatus 39 reads out the user's credit card number and the expiration date from the message user database 34. These data are transmitted through the closed network 27 to the credit card corporation, and the balance is charged by the credit card corporation. When a credit card is used, the credit card number and the expiration date are transmitted only within the closed network, where the data is more secure than in Internet.

The information provider 20 may charge a user's information fee to the message distribution apparatus 39. In this case, the message distribution apparatus 39 would subtract the information fee from the value of the user's parameters. If the value of the user's parameters is not sufficient, the balance is charged to the user's credit card account by the credit card corporation through the closed network 27. When the user displays a message on the message viewer 76 or operates a button within the message viewer window, the value of the user's parameter is increased. Therefore, the user can access the information provider 20 for free when the value of his parameters is sufficiently high. In other words, the user may access Internet 32 for free by opening the message viewer 76 frequently.

In this embodiment, if a user is inactive, no message is displayed on the message viewer 76. This prevents an access fee from being charged to the message provider when the user does not view the display.

1.5 Processing Message Access Log 37

Figure 22:
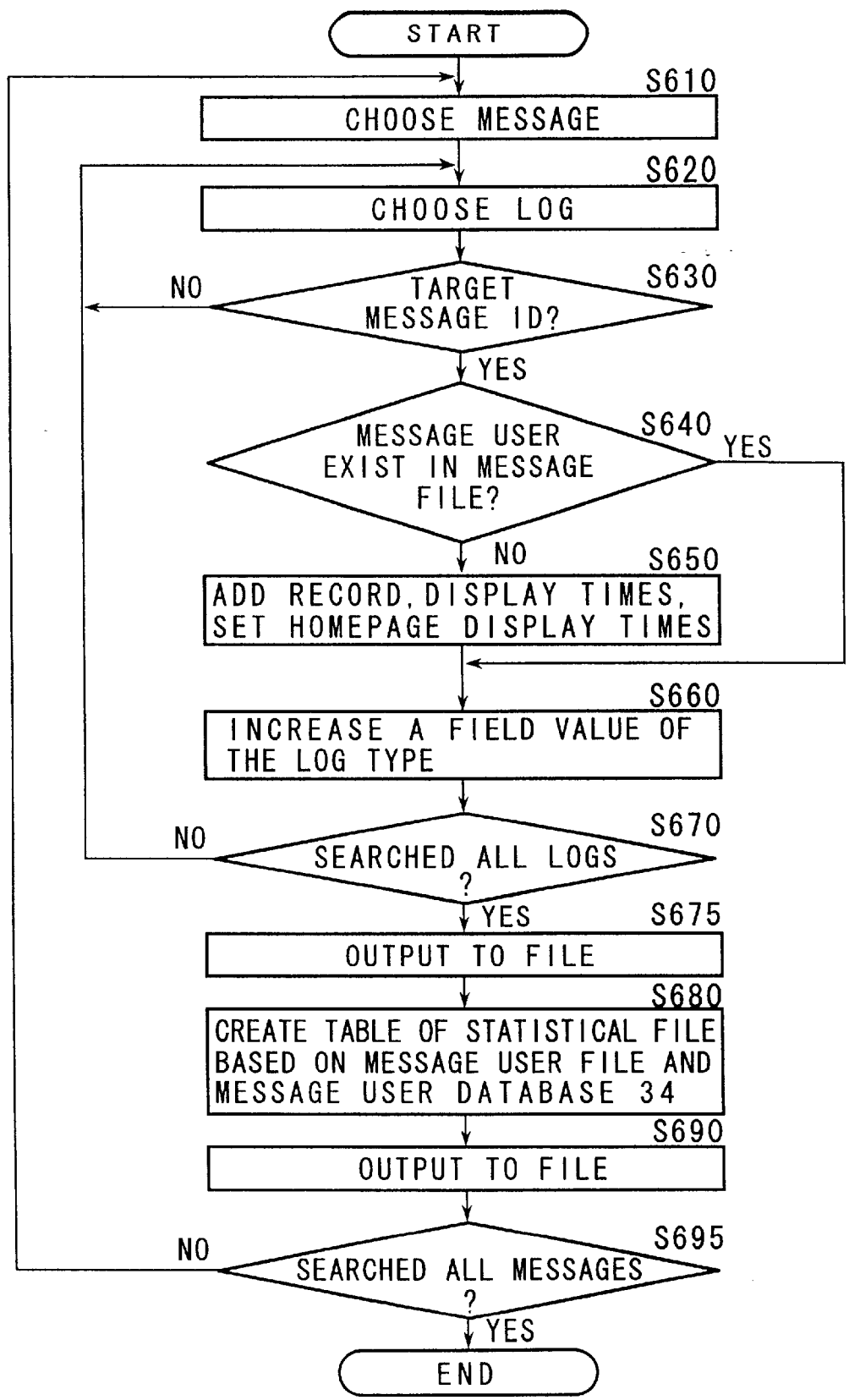
FIG. 22 is a flowchart showing the statistical process for the message access log 37.

FIG. 22 is a flowchart showing the statistical process for the message access log 37, which is executed by the message distribution apparatus 39. The message distribution apparatus 39 executes the operations shown in this flowchart periodically, for example, once a month. First, one of the messages is selected (S610), and the first item in the message access log 37 is selected (S620). If the message ID of the item selected in S620 is different from the message ID of the message selected in S610 (S630), the item does not correspond to that message, and therefore, the process returns to S620 to select the next item.

FIG. 23 illustrates a message user file indicating the users who accessed a particular message. One message file is created for each message. The message file records the number of times a user displayed a message, the number of times the user displayed the home page which is linked to that message, and the number of times the user requested material offered in that message, in association with the message user ID of the user who accessed the message. If the message ID of the item selected in S620 is the same as the message ID of the message selected in S610 (S630), then the distribution apparatus 39 determines whether or not the message user ID of the item selected in S620 has already been registered in the message user file (S640).

If the message user ID has not been registered yet, a record of that message user is added to the file, and the number of times the message image is displayed, the number of times the relevant home pages are displayed, and the number of times the material is requested are set to zero (S650). Then, based on the item's access type (i.e., display of the message, display of relevant home pages, or request for material), the value of the corresponding field in the message user file is increased (S660) The steps S620 through S660 are repeated until all of the items in the message access log 37 are checked (S670), and the obtained message user files are output (S675).

FIG. 24 is a statistics file showing the access statistics for each message. One statistics file is created for each message. The statistics file stores the access statistics for each group (e.g., male) represented by the user characteristics in the message user database. The statistic file stores, for example, for the group of male users, the number of times a message was displayed, the number of times the home page linked to the message was displayed, the number of users who displayed the home page, and the number of users who requested material.

Upon outputting the message user file (S675), the message distribution apparatus 39 sums up the field of the message display numbers and the field of the home page display numbers to calculate the total number of times the message was displayed and the total number of times users accessed the home page. The number of users who displayed the message is counted. The number of users who never displayed the home page (users whose home page display number is zero) is subtracted from the number of users who displayed the message to obtain the number of users who displayed the home page. The number of users whose material request numbers are other than zero is counted.

The message distribution apparatus 39 searches the user characteristics of each of the listed users from the message user database, based on the message user IDs. The message distribution apparatus 39 creates a statistical table for each of the user characteristics, which contains the number of times the message was displayed, the number of times the home page was displayed, the number of users who displayed the message, the number of users who displayed the home page, and the number of users who requested material (S680). The table is output to a file (S690). The steps S610 through S695 are repeated for every message (S695), and the process terminates. The reaction of message users to each message can be recorded in terms of the user characteristics.

2. Second Embodiment

The network system structure of the second embodiment is the same as that of the first embodiment. The overall operation is also similar to that of the first embodiment. Therefore, only different operations will be explained.

2.1 Operation of Terminal 10 after Connection

Figure 25:
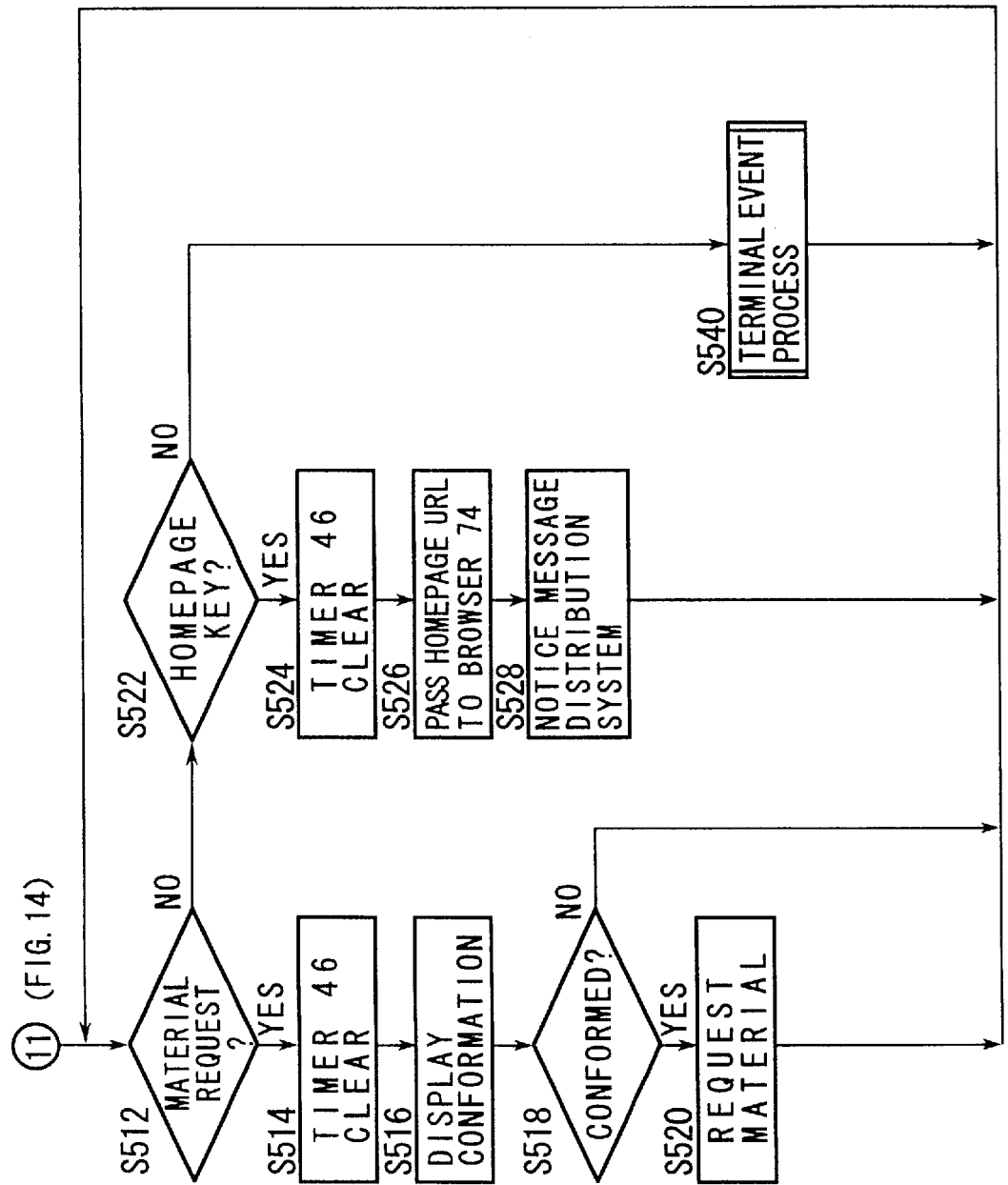
FIG. 25 is a flowchart of the input process of the terminal 10.

FIG. 25 shows the input process of the terminal 10. The operation flow from S512 through S528 is the same as in the first embodiment. However, in this embodiment, event processing by the terminal 10 is performed regardless of whether the user is active (S522, S540).

2.2 Event Process of Terminal 10

Figure 26:
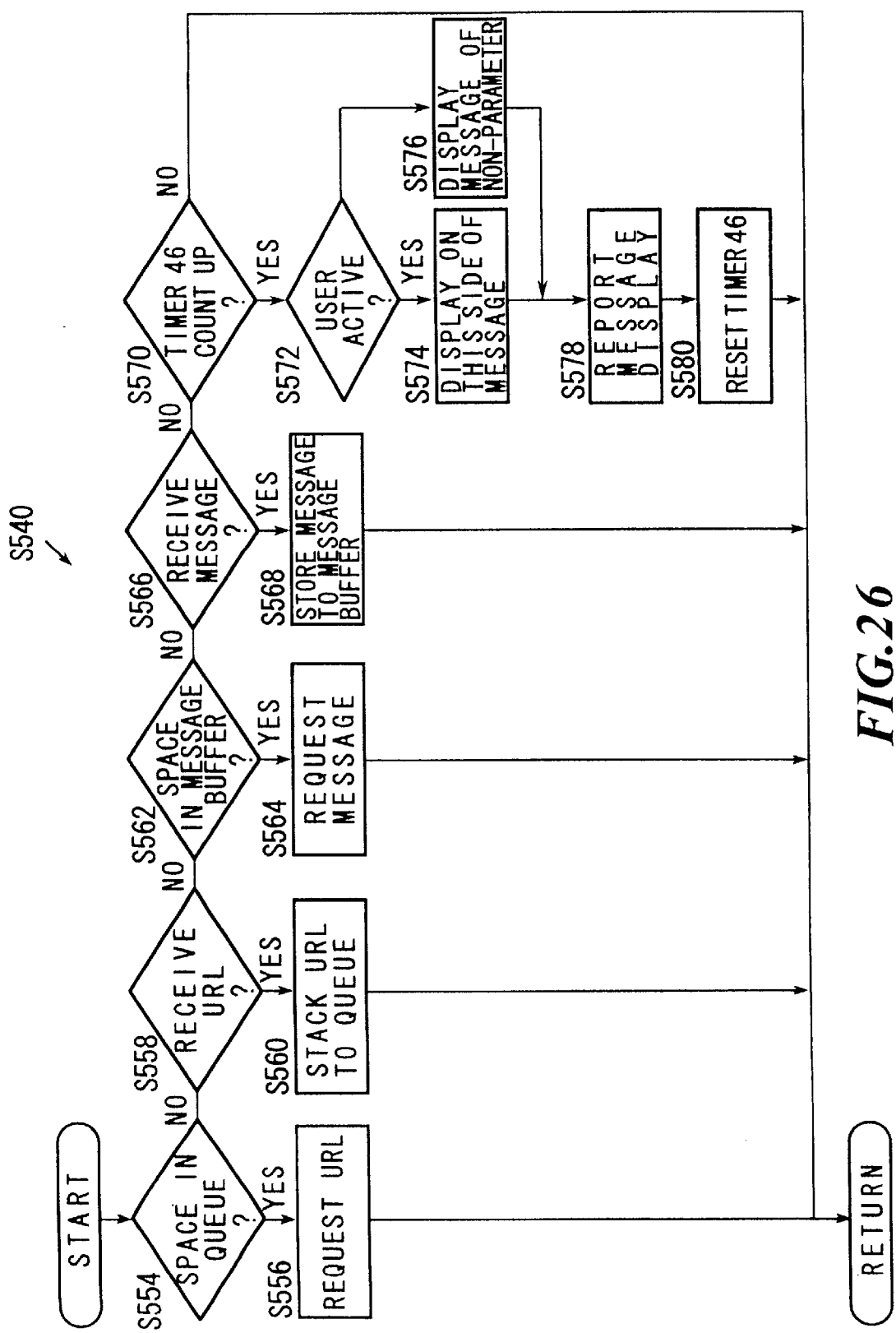
FIG. 26 is a flow chart of the event process of the terminal 10 in the second embodiment.

FIG. 26 shows the details of the event processing (S540) of the terminal 10. The steps S544 through S570 and the steps S578 and S580 are the same as in the first embodiment. When the timer 46 runs out (S570), it is determined whether the user is active (S574). If the user is inactive, those messages whose parameter value is zero ("0") are searched for from the message database and displayed (S576). If the user is active, messages are successively displayed in the order of receipt (S574).

In this embodiment, a message is displayed even when the user is inactive. However, because only those messages that have a parameter value of "0" are selected when the user is inactive, no value is added to user's parameter in the user database. The message provider is not charged for the message display when the user does not actively view the display screen.

3. Third Embodiment

The network system construction of this embodiment is the same as that of the first embodiment. The connection operation of the whole system is also similar to that of the first embodiment. However, the connection sequences among the terminal 10, the connection manager 23, and the message manager 24 are different from those of the first embodiment. Thus, only these points of difference are explained.

Figure 27:
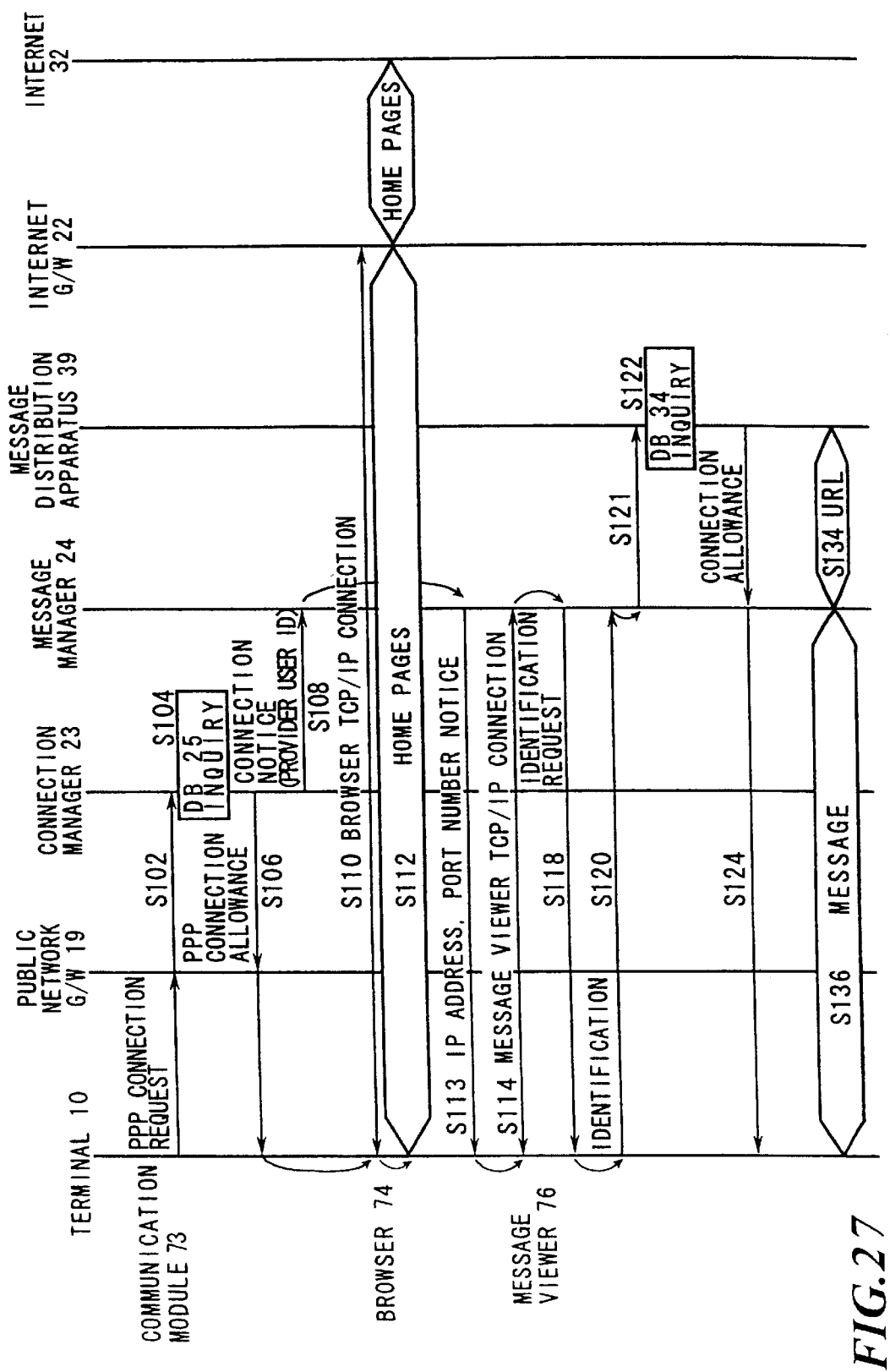
FIG. 27 is a connection sequence in the third embodiment.

FIG. 27 shows a connection sequence of this embodiment. The processes from S102 to S112 are the same as the corresponding processes of the first embodiment. In the first embodiment, when the connection manager 23 allows the PPP connection, the connection module 78 of the message viewer 76 searches for a message manager 24 to which the TCP/IP connection can be made. For example, the connection module 78 searches the message managers 24 of all the information providers 20 to find one to which the connection module 78 can connect, using the IP addresses and port numbers corresponding to the message managers.

In this embodiment, when the user is to access Internet 32 through the connection manager 23, the connection manager 23 notifies the message manager 24 that a data link has been established from the terminal 10 (S108). After receiving the provider user ID sent from the connection manager 23 (S108), the message manager 24 sends its own IP address and port number to the connection module 78 of the message viewer 76 (S113).

Based on the received IP address and the port number, the connection module 78 can immediately specify an appropriate information provider 20 and its message manager 24 to connect to. Then, the connection module 78 makes a TCP/IP connection to the message manager 24 using the received IP address and port number (S114). The IP address specifies a specific information provider from among the many information providers 20. The port number specifies one message manager from among the several communication modules in the information provider 20.

According to this embodiment, the IP address and port number are given by the message manager 24. Therefore, the connection module 78 can connect the terminal 10 to the appropriate message manager 24 quickly and correctly. Because the message viewer 76 can connect itself to the message manager 24 and execute subsequent operations independently of the browser 74, existing general browsers (e.g., NETSCAPE™, MOSAIC™ and so on) can be used as the browser 74.

4. Fourth Embodiment

The network system construction of this embodiment is also the same as the system construction of the first embodiment. Thus, its explanation is eliminated. In the connection sequence of this embodiment, the IP address and the port number are sent from the message manager 24 to the connection module 78 as in the third embodiment. The update information is sent from the message distributor 39 to the message viewer 76 and displayed on the terminal. The display operation of the update information is explained in detail below.

Figure 28:
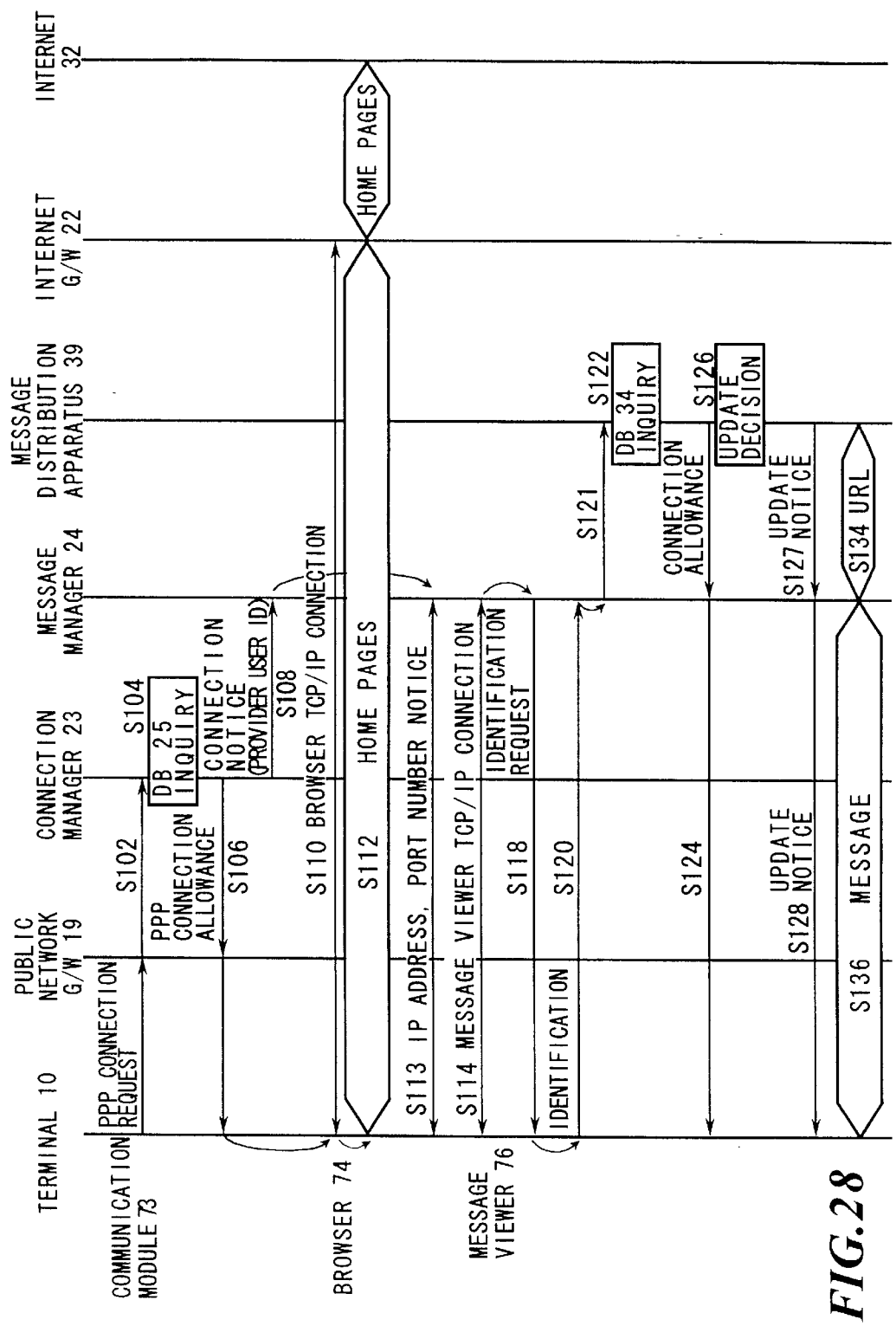
FIG. 28 is a connection sequence in the fourth embodiment.

FIG. 28 shows the connection sequence in this embodiment. As shown in S113, the IP address and the port number are sent from the message manager 24 to the connection module 78. Other operations up to S124 are the same as those of the first embodiment. In this embodiment, the message distributor 39 decides whether the update information should be sent (S126) after transmitting the connection allowance at S124 (S126). If the update information needs to be sent, the message distribution apparatus 39 sends the update information to the message viewer 76 (S128)

Figure 29:
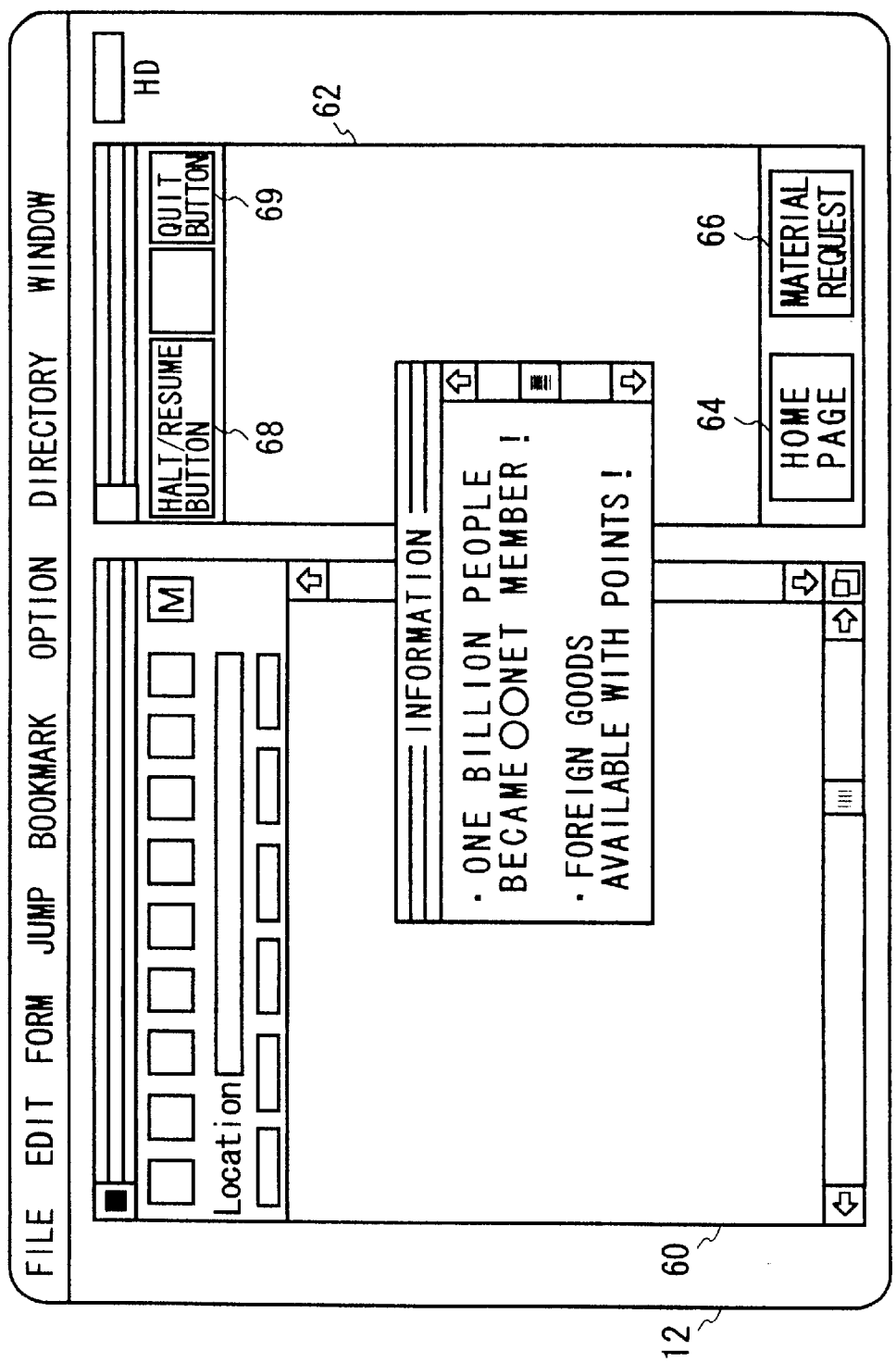
FIG. 29 illustrates an example of the update information displayed on the display 12 according to the fourth embodiment.

FIG. 29 shows examples of the update information. The update information includes information about new services, such as newly available goods, and new software programs available by communication between the message viewer 76 and the message manager 24. The update information is updated at irregular intervals by the message provider, the providers of the message distributor, or Internet providers, and is stored in the message distribution apparatus 39. The condition for the message distribution apparatus 39 to send update information (S126) is, for example, that update information which has never been sent to the user exists. In order to determine if this condition is satisfied, the message distribution apparatus 39 compares the last communication time with the last update time in the message user DB 34. When the last communication time is before the last update time, the message distributor 39 determines that there is update information, which has not been sent and sends this update information.

Figure 30:
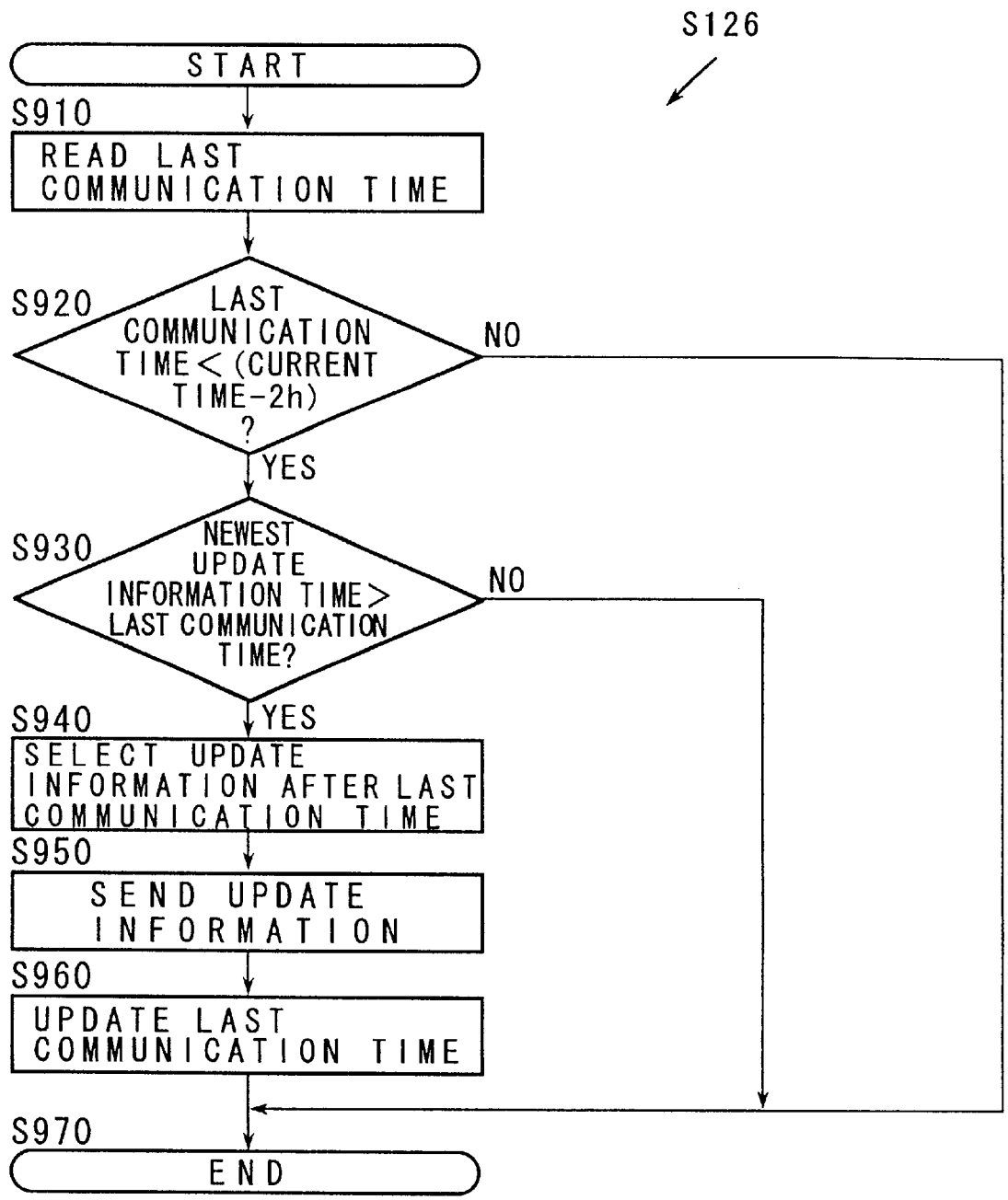
FIG. 30 is a flow chart showing the detailed process of update determination in the message distribution apparatus 39.

FIG. 30 shows in detail the process wherein the message distributor determines whether to send the update information (S126). First, the message distribution apparatus 39 reads the last communication time from the message user DB 34 (S910). Then, the message distribution apparatus 39 determines whether the last communication time is within two hours of the present time (S920). Specifically, the last communication time is compared with the time two hours before the present time. If the last communication time is more than two hours before the present time, then the process S930 is executed. On the other hand, if the last communication time is within 2 hours of the present time, the process ends (S970) in order to avoid displaying the update information too frequently. In this case, the time at which the message viewer 76 and the message manager 24 connect is not recorded as the last communication time. Thus, repeated displays of the update information within a predetermined time interval may be avoided.

When the user frequently repeats connecting and disconnecting the message viewer 76 and the message manager 24, the user may feel that update information does not need to be displayed at every connection. Thus, if the user reconnects within a predetermined time from the last communication time, the update information is not displayed. Thus, too frequent displays of the update information may be avoided.

In S930, the last update time and the last communication time are compared. If the last update time is later than the last communication time, the update information provided at the last update time is selected (S940). The selected update information is sent to the message viewer 76 from the message distribution apparatus 39 (S950). When the update information is sent, the last communication time in the message user DB 34 is reset to the current time (S960), and this process ends (S970).

As a modification of this embodiment, the update information may be sent a predetermined number of times (for example, 3 times) to the user. In this case, the last several communication times are recorded into the memory. Then, the oldest communication time in the memory is compared to the update time of the update information. All update information, which was updated after the oldest communication time, is sent to the users.

5. Fifth Embodiment

The network system construction of this embodiment is also the same as that of the first embodiment. Thus, its explanation is omitted. In the connection sequence of this embodiment, the IP address and the port number are sent from the message manager 24 to the connection module 78. The update information is sent from the message distributor 39 to the message viewer 76, and displayed on the message viewer 76. In this embodiment, a new message viewer can be obtained when information about the new message viewer module is transmitted as update information.

Figure 31:
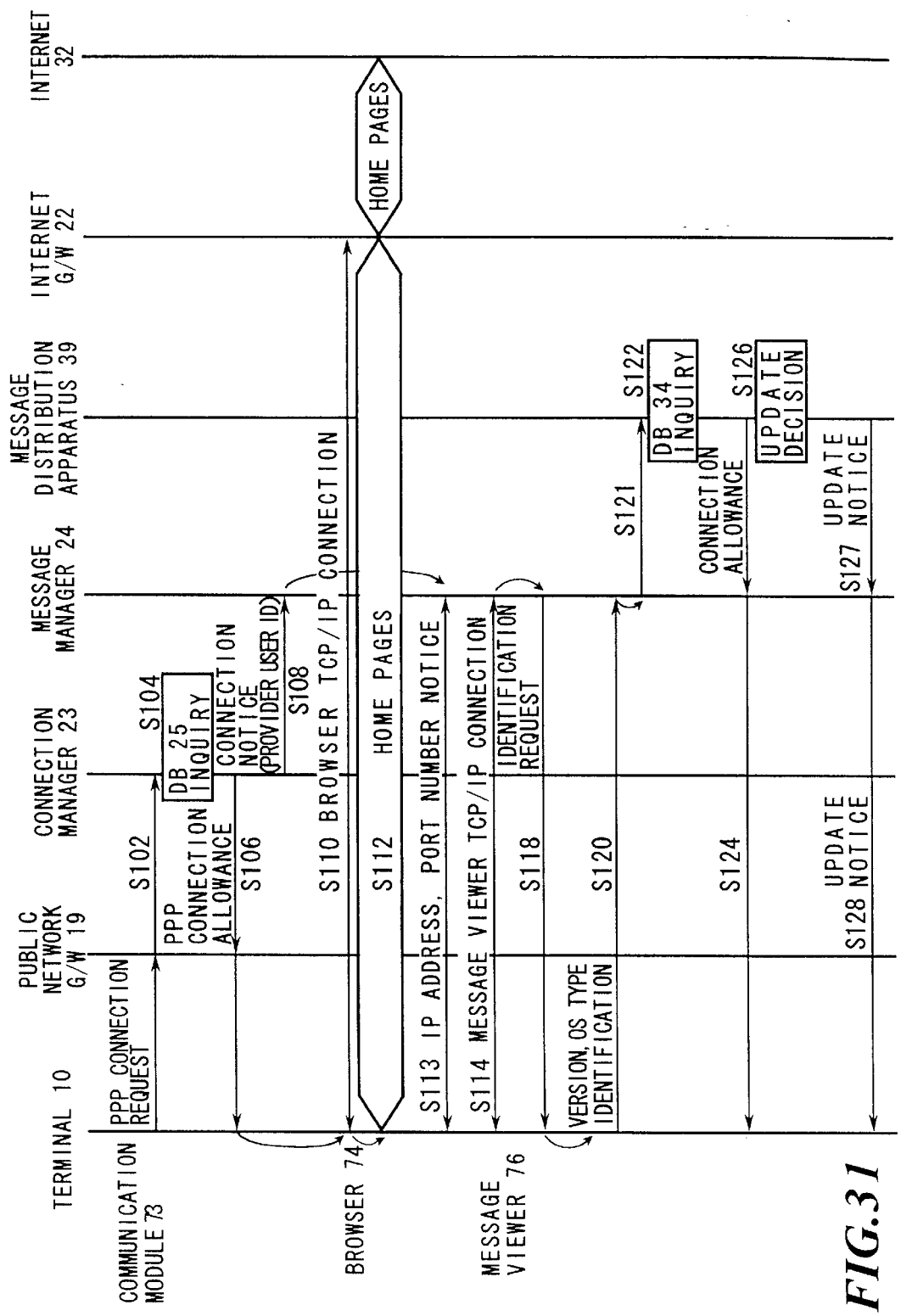
FIG. 31 is a part of a connection sequence in the fifth embodiment.

FIG. 31 shows a part of the connection sequence in this embodiment. The process up to S128 is basically the same as that of the fourth embodiment. However, in this embodiment, an upgraded message viewer 76 is sent to the terminal 10. For this purpose, in addition to the message user ID and the password, the version of the message viewer 76 and the OS type of the terminal 10 are transmitted at the time approval is transmitted at S120.

Figure 32:
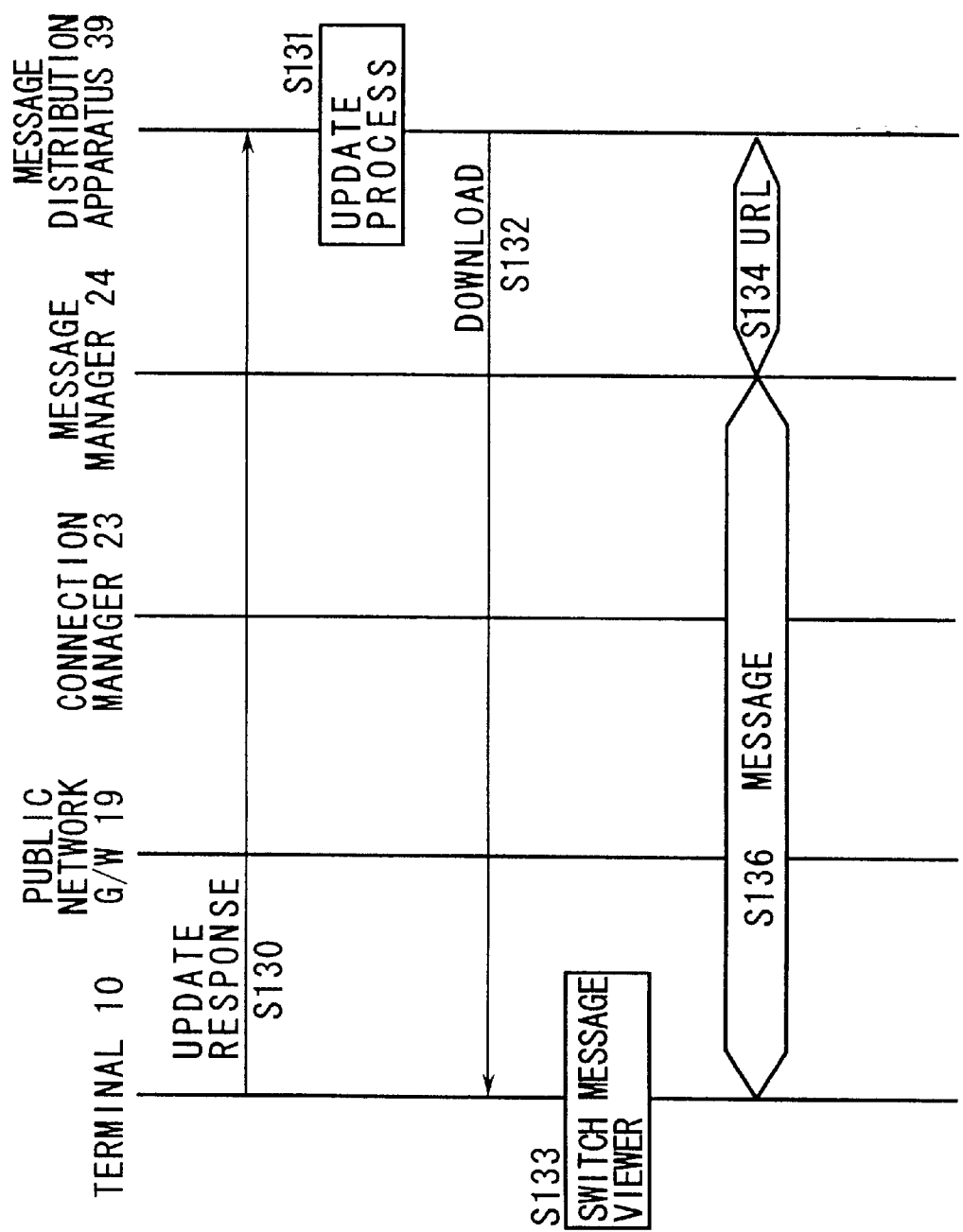
FIG. 32 is a part of a connection sequence in the fifth embodiment.

FIG. 32 shows the rest of the connection sequence. When the update information about the upgraded message viewer 76 is transmitted (S128), the update information is displayed on the terminal 10.

Figure 33:
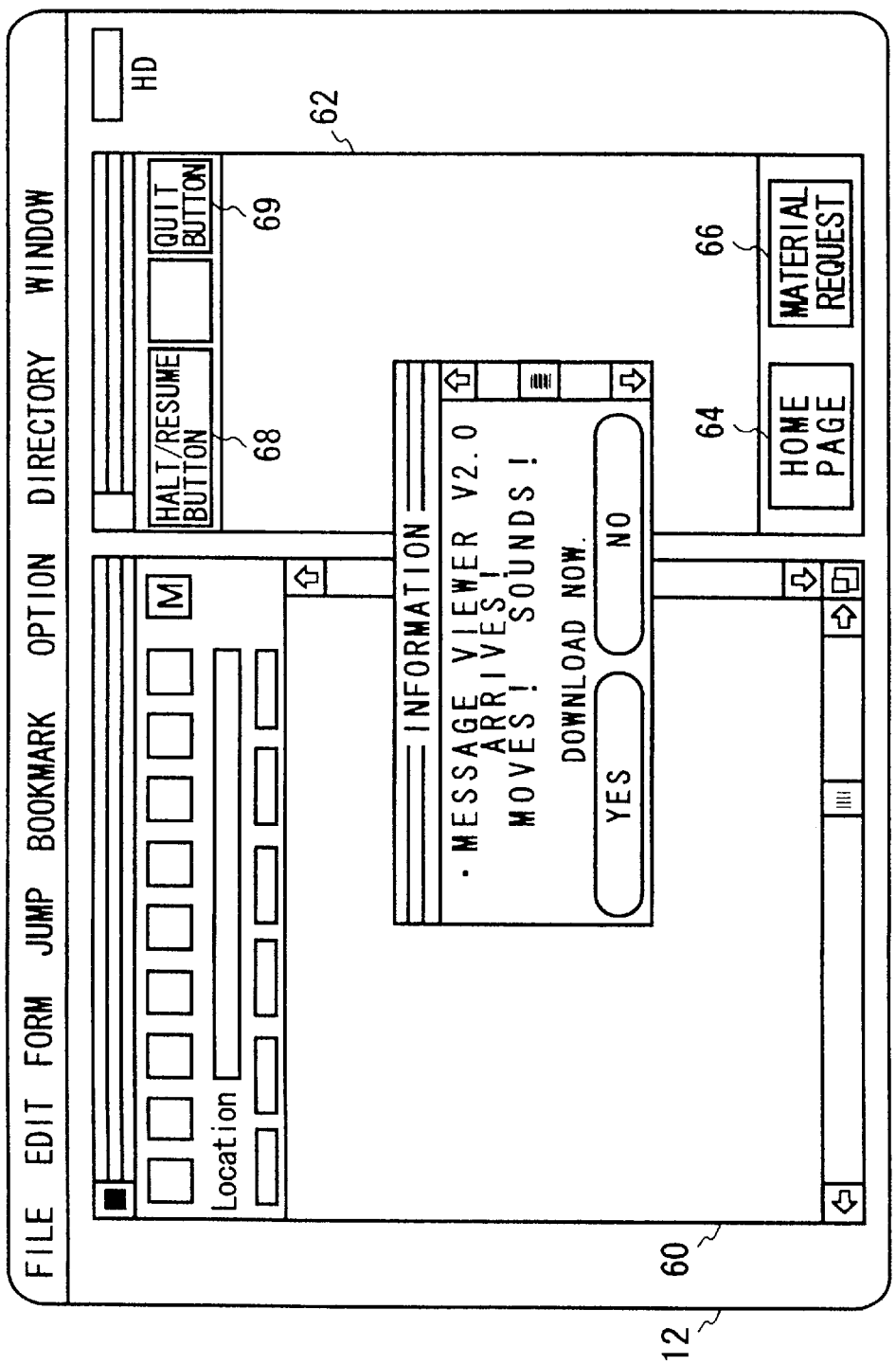
FIG. 33 illustrates an example of the update information displayed on the display 12 according to the fifth embodiment.

FIG. 33 shows an example of this update information. In the update information window, there is a button to down-load the software for upgrading the message viewer 76. The user sends an update response, indicating whether he wishes to obtain the message viewer 76, to the message distribution apparatus 39 (S130) The message distribution apparatus 39 determines whether to download the software according to the update response (S131: update). If the message distribution apparatus 39 determines that the software is to be downloaded, the software is sent to the connection module 78 of the message viewer 76 (S132: download).

The user can obtain the software to upgrade the message viewer 76 by the above process. In this way, the message viewer 76 is switched (S133), and the upgraded message viewer 76 controls the communication and image display. The user may also obtain other software by communication between the message viewer 76 and the message distribution apparatus 39. After the soft ware is sent from the message distribution apparatus 39, it is stored in the hard disk drive 50 of the terminal 10.

Figure 34:
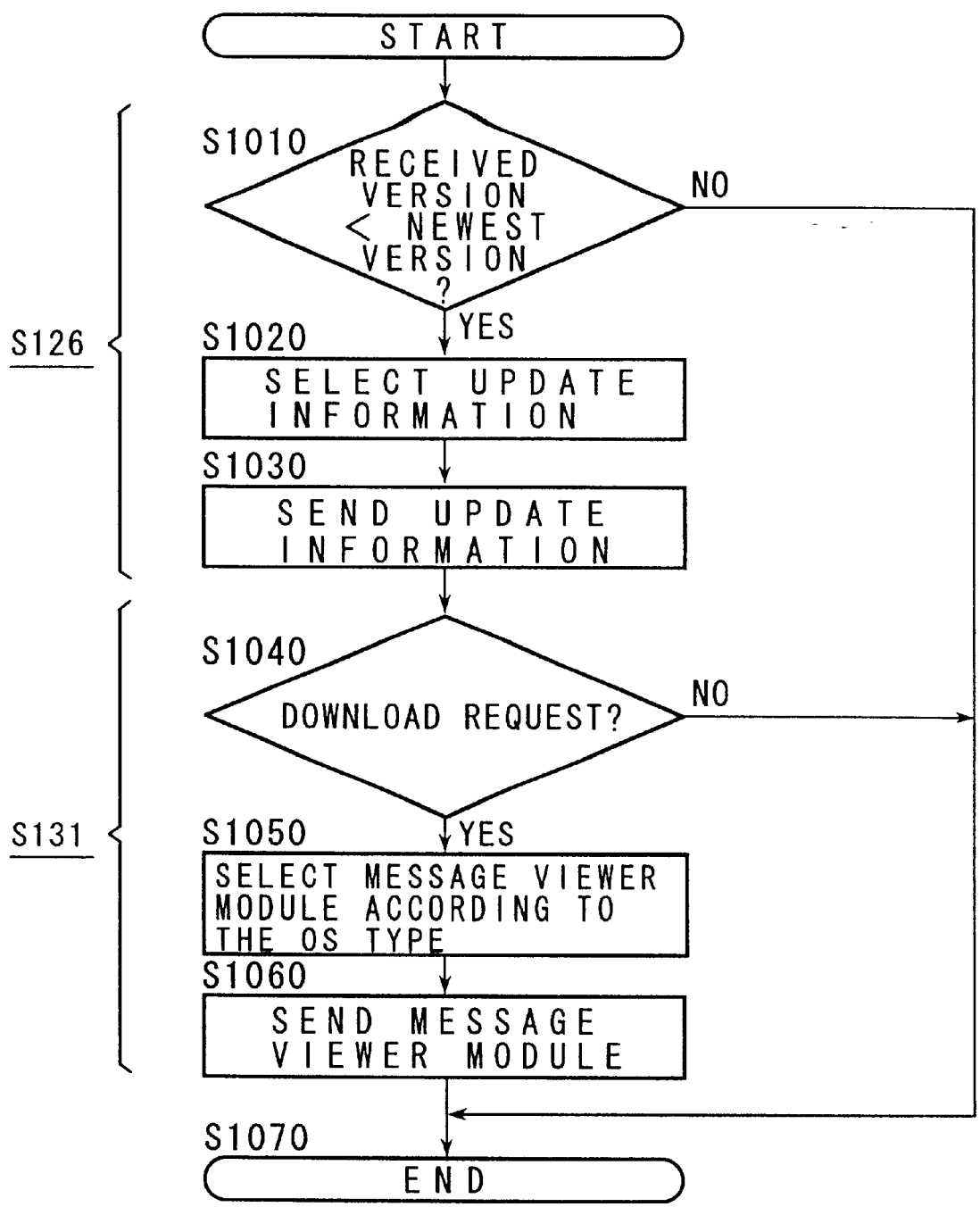
FIG. 34 is a flow chart of the update determination and the update process executed by the message distribution apparatus 39.

FIG. 34 shows the process of determining whether to send update information (S126) and the update process (S131), which are performed by the message distribution apparatus 39. First, it is determined whether the received message viewer module version is the newest (S1010). If the version is the newest, this process ends (S1070). If the version is not the newest, the update information about the new message viewer module is selected (S1020) and sent (S1030). Then it is determined whether there is a downloading request in response to the update information (S1040). If downloading is not requested, this process ends (S1070). If downloading is requested, the newest message viewer module is selected (S1050) according to the OS type of the terminal 10, and the selected message viewer module is sent to the terminal 10 (S1060). By the above process, users may easily obtain desired software.

In the fourth and fifth embodiments, as described above, the message distribution apparatus 39 determined whether to send the update information. However, as an alternative, the message manager 24 may carry out this process. In such a case, the message manager 24 uses the last communication time and the last update time received from the message distribution apparatus 39, and decides whether to send the update information. When the message manager 24 controls sending the update information, the burden on the message distribution apparatus 39 is reduced.

6. Sixth Embodiment

Figure 35:
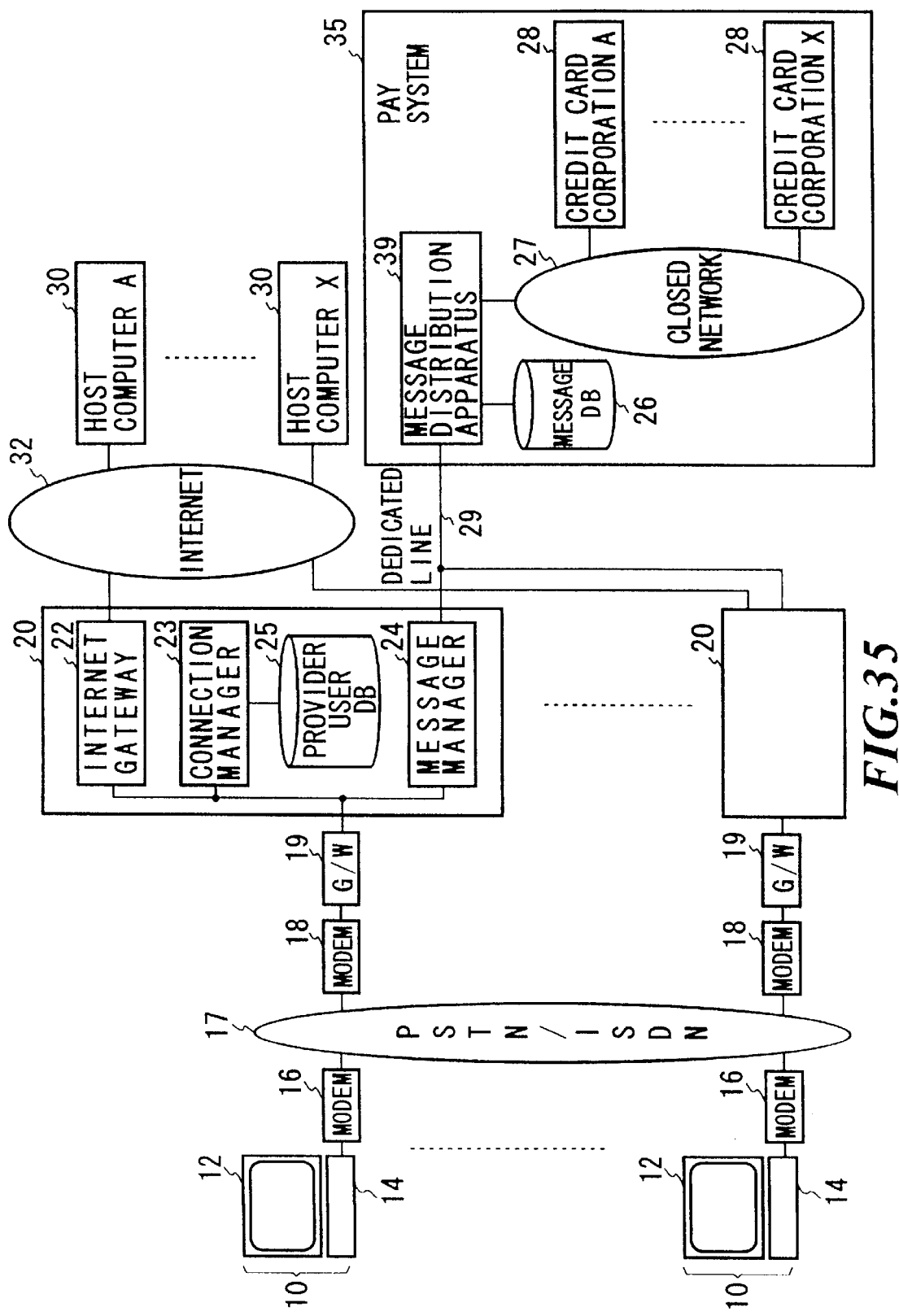
FIG. 35 is a block diagram of the overall system construction in the sixth embodiment.

FIG. 35 shows the structure of the overall system in accordance with the sixth embodiment. Unlike the first and second embodiments, the message database 26 is here connected to the message distribution apparatus 39, instead of being connected to the message manager 24. Accordingly, in this embodiment, message requests from the message viewer 76 are transmitted through the message manager 24 to the message distribution apparatus 39. The message manager 24 performs merely connection and communication between the message distribution apparatus 39 and the message viewer 76.

In this embodiment, it is not necessary to provide a message database 26 for each of the plurality of information providers 20. This embodiment can also simplify the structure of the message manager 24. These factors lead to a less expensive system structure. Furthermore, since only a single message database 26 is provided in the overall system, maintenance of the message database 26 can be facilitated. Even if the message distribution apparatus 39 and the information provider 20 are located physically apart far from each other, for example, in different countries, the message database 26 is maintained in the location where the message distribution apparatus 39 is established. This results in reduced maintenance costs.

On the other hand, in the first and second embodiments, the load on the message distribution apparatus 39 and on the dedicated line 29 is lightened. Therefore, in a situation where the frequency of access to the message database 26 is higher, the structure of the first or second embodiment can operate more effectively.

7. Seventh Embodiment

Figure 36:
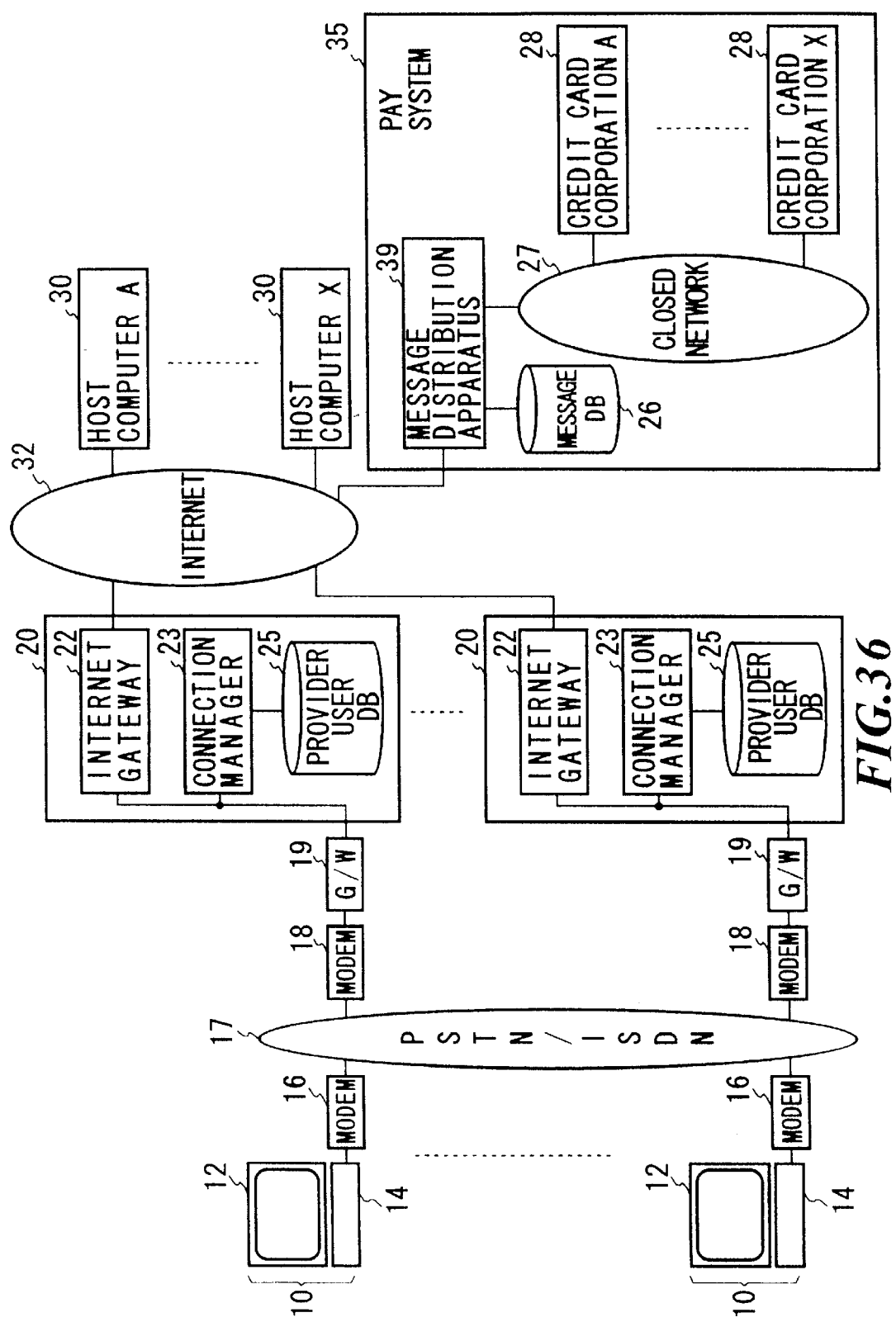
FIG. 36 is a block diagram of the overall system construction in the seventh embodiment.

FIG. 36 shows the overall structure of the system according to the seventh embodiment. Unlike the sixth embodiment, the message distribution apparatus 39 is connected to the information provider 20 through Internet 32, instead of via the dedicated line 29. Also, the system of this embodiment does not include message managers 24. Accordingly, message requests sent from the message viewers 76 are forwarded to the message distribution apparatus 39 through Internet gateways 22.

In this structure, the information providers 20 do not need message managers 24, resulting in less expensive system structure. The system is established by utilizing existing Internet providers as information providers 20. Even if the message distribution apparatus 39 is provided in only a limited number of countries, the service can be provided wherever Internet exists anywhere in the world.

On the other hand, the structure of the first and second embodiments can reduce the burden on the message distribution apparatus 39 and the dedicated line 29. Therefore, in a situation where the frequency of access to the message database 26 is higher, the system of the first or second embodiment can operate more effectively.

8. Eighth Embodiment

Figure 37:
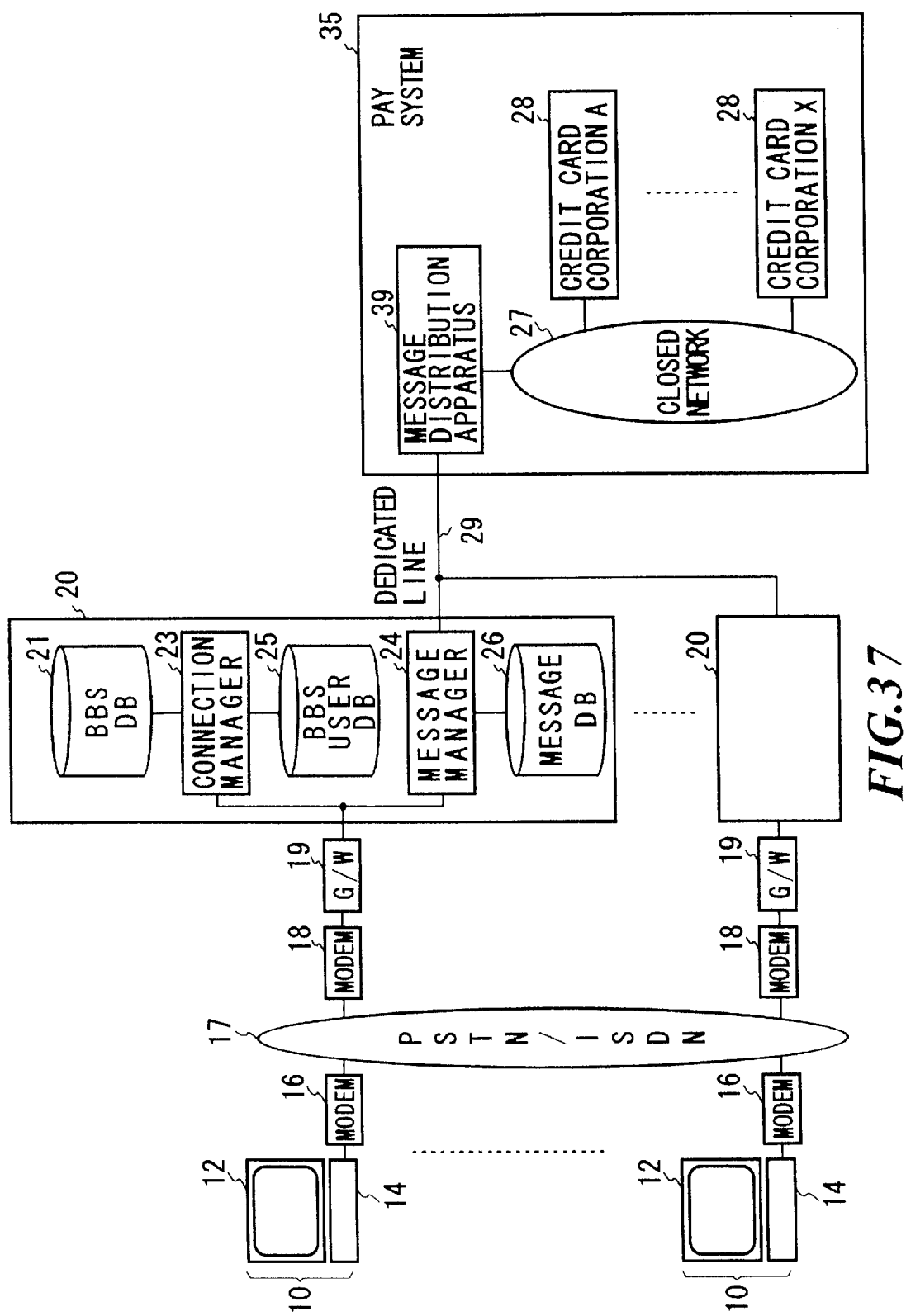
FIG. 37 is a block diagram of the overall system construction in the eighth embodiment.

FIG. 37 shows the overall structure of the system according to the eighth embodiment. In this embodiment, a BBS, such as COMPUSERVE™, NIFTY-SERVE™, AOL™, etc., is used as an information provider 20, instead of connecting to Internet 32. The information provider 20 charges the BBS information fee for each user to the message distribution apparatus 39. The message distribution apparatus 39 determines whether the value of the user's parameter is sufficiently high to pay the information fee. If the value of the user's parameter is adequate, the message distribution apparatus 39 pays the information fee to the information provider 20, deducting from the value of user's parameter. If the value of the user's parameter is too low to pay the information fee, the balance is charged to the user's credit card account via the closed network 27.

The user may access such a BBS for free by frequently displaying a given message on the message viewer 76, as explained above.

9. Ninth Embodiment

In the above-described embodiments, every time a message is displayed on the user's message viewer 76, the value of the user's parameter is increased, and an information fee for the message is charged. However, as an alternative embodiment, the value of the user's parameter may be increased and an information fee for the message may be charged only when the user takes some action with regard to the displayed message. This can prevent the situation where the value of the user's parameter is increased and an information fee for the message is charged even though the user has not viewed the message.

Alternatively, the value of the user's parameter may be increased and an information fee for the message may be charged, only when the user's response to the content of the message is proper. For example, a question, to which the user can certainly give a correct answer based on the content of the displayed message, maybe displayed in an area of the message. The value of the user's parameter would be increased only when the user inputs a correct answer. In other words, the value of the user's parameter would be increased and an information fee for the message would be charged only when the user reads the message.

Either the message viewer 76 or the message distribution apparatus 39 may be used to determine whether the user's response is correct. If the message viewer 76 is used for the determination, this does not make traffic on the communications network heavier, and no extra burden is put on the message distribution apparatus 39. If the message distribution apparatus 39 is used for the determination, no extra burden is put on the message viewer 76, and the determination sequence for deciding whether the user's response is correct can easily be changed simply by updating the software of the single message distribution apparatus 39.

10. Tenth Embodiment

The method of increasing the value of the user's parameter of the ninth embodiment may be combined with that of embodiments 1 through 5. For example, the value of the parameter is increased by a first predetermined amount when the message is displayed, by a second predetermined amount only when a button in the message viewer window is operated, and by a third predetermined amount only when the user's response to the message is correct. The amount of increase in the value of the parameter is charged to the message provider. The charge for the message is determined according to an expectation value, which indicates the extent to which the message attracts the user's attention.

11. Eleventh Embodiment

Although, in the above-described embodiments the payment system 35 pays for the goods by using a credit card, the payment system of the invention covers any system which has the function of paying the bill for the goods to the store. For example, the system may transfer money from the user's bank account to the store, or withdraw money from the user's account and transfer it to the bank account of the payment system, and then, further transfer it to the store.

Although, in the above-described embodiments the browser 74 displays home page information of Internet 32, the browser 74 may be an Internet telephone or Internet TV phone which communicates by voice with Internet 32.

Although the message user database 34, the transmittal condition database 36 and the connection log 38 are shown as separate disc devices, they may be stored in a single device. The relationships among the data of the respective fields can be made in various file structures. For example, the message user database 34, the transmittal condition database 36 and the connection log 38 may be arranged in different areas of a single file.

The floppy disk 56 or the CD-ROM 58, as examples of the recording media, can store a portion or all of the functions of the operation flow of the terminal 10. If a portion of the function of the information provider 20, the host computer 30 or the payment system 35 is to be executed by the terminal 10, the portion that is executed by the terminal 10 can be stored in the floppy disk 56 or the CD-ROM 58. The floppy disk 106 may store a portion or all of the functions of the devices other than the information provider 20, the host computer 30 and the payment system 35. The stored programs may be read out from the recording medium directly to the RAM for execution, or may be installed in the hard disc drive first, and then read out to the RAM for execution. The programs may be stored in a single recording medium, or in a plurality of recording media. The programs may be stored in an encoded form.

In addition to floppy disks and CD-ROM, the recording media used in the invention may include optical recording media, such as DVDs, magnetic recording media, such as MDs, magneto-optical recording media, such as PDs, tape media, and semiconductor memory, such as IC cards and miniature cards. Also, the storage, such as a hard disc drive or the RAM provided in the information provider 20, the message distribution apparatus 39, or the host computer 30, may be used as the recording medium. If this is the case, the programs are supplied to the terminal 10 through the communications network. All such recording media are used exclusively to manufacture the terminal 10, the message manager 24 or the message distribution apparatus 39. Therefore, it is obvious that the manufacture and sale of such recording media will constitute infringement of the patent rights based on the present invention.

Although the present invention has been described in connection with specific embodiments, the present invention is not limited to the scope of the embodiments. Those skilled in the art can make various modifications and substitutions without departing from the spirit and the scope of the present invention, which is defined by the appended claims.

For example, a portion of the function of the information provider 20, the message distribution apparatus 39, or the host computer 30 can be executed by the terminal 10 to reduce the load on the information provider 20, the message distribution apparatus 39, or the host computer 30. Alternatively, a portion of the function of the terminal 10 may be executed by the information provider 20, the message distribution apparatus 39, or the host computer 30 to reduce the burden on the terminal 10. It is clear that these modifications are also included within the scope of the present invention.

The value of the parameter assigned to the user increases as the user displays or operates on a message. If the value of the user's parameter is sufficiently high, the message distributor pays the user's connection fee or the price of the goods purchased by the user to Internet or the BBS using the value of the user's parameter. The user may access the communications network, such as Internet or a BBS for free, or buy goods from the communications network for free, by frequently displaying messages on the terminal.

INDUSTRIAL UTILIZATION

According to the preferred embodiment of the present invention, a message provider can acquire a number of subscribers by offering the service of Internet or a BBS for free. The message provider can provide each message to those for whom the message is suitable. Therefore, an information fee is charged only for those messages, which attract the user's attention. Furthermore, according to the preferred embodiments of the present invention, the system providers can reliably provide update information to users.

What is claimed is:

1. A system connected to plural terminals through a communication network for having advertising messages transmitted to the terminals, the advertising messages comprising information in digital form in the form of at least one of images, text, sounds and combinations thereof, at least some of the advertising messages further comprising respective links to additional information in digital form available to the terminals through the communications network and related to the respective advertising message, the system comprising:

a first database which stores message IDs for the advertising messages in association with:
a charge limit of how many times to display the advertising, message to any given user,
an absolute limit of how many times to display the advertising message to all users,
a time period in which the advertising message may be displayed,
a charge for when the terminals activate the link to additional information;
a message searcher for selecting message IDs for transmitting from the first database using the charge limit, the absolute limit and the time period;
a transmitter for transmitting message IDs selected by the message searcher to the terminals;
a request receiver for receiving requests from the terminals through the communications network, the requests reflective of the terminals having activated the links to additional information;
a statistics processor for:
counting a link count of how many times each of the links was activated, based upon receipt of the requests,
determining a fee due based upon the link count and the charge for when the terminals activate the links to additional information.

2. The system of claim 1, wherein the first database also stores, for plural message IDs, characteristics of a class of users to whom it would be appropriate to transmit the corresponding advertising messages, the system further comprising:
a user database storing characteristics of plural users in association with a user ID of each user;
means for reading out the characteristics from the user database based on the user ID;
wherein the transmitter transmits the message ID which is retrieved by the message searcher.

3. The system of claim 1 further comprising:
an adder for increasing a value of a parameter when a message ID is transmitted by the transmitter;
means for offering a good or service to the user through the communication network;
means for determining prices of the good or service depending on the value of the parameter;
means for decreasing the value of the parameter when the user orders the good or service.

4. The system of claim 1, wherein the message ID comprises a uniform resource locator (URL).

5. The system of claim 3 wherein the first database has a first message ID which increases the value of the parameter when the corresponding advertising message is displayed, and a second message ID which does not increase the value of the parameter when the corresponding advertising message is displayed.

6. The system of claim 1, wherein the transmitter has a notification means for providing the terminals with information which identifies the transmitter.

7. The system of claim 3 wherein the adder increases the value of the parameter when the user inputs a correct answer to a question displayed in the advertising message.

8. The system of claim 1, further comprising:
an update information storage which stores update information being updated independently of the terminal;
an update information transmitter for transmitting the update information to the terminal a predetermined number of times through the communications network.

9. The system of claim 8, wherein;
the predetermined number of times is one;
the update information transmitter has a determination means for determining whether the update information has already been transmitted to the user, and for transmitting the update information when the determination means determines that the update information has not already been transmitted.

10. The system of claim 8, wherein the update information transmitter has a counter for counting, for each user, the number times the update information has been transmitted, and the update information transmitter transmits the update information to a user when the update information has not been transmitted to that user the predetermined number of times.

11. The system of claim 10, wherein the update information transmitter has a comparison means for comparing the time which has elapsed since the last transmission of the update information with a predetermined period of time, and the update information transmitter transmits the update information when the time lapse is longer than the predetermined period of time.

12. A system connected to plural terminals though a communication network for having messages transmitted to the terminals, the messages comprising information in digital form in the form of at least one of images, text, sounds and combinations thereof, at least some of the messages further comprising, respective links to additionial information in digital form available to the terminals through the communications network and related to the respective message the system comprising:
a transmitter for transmitting selected message IDs to the terminal the message IDs identifying messages;
a user database which stores characteristics of users of the terminals in association with user IDs;
a user ID receiver for receiving the user IDs from the terminals;
a characteristics reader for reading the characteristics from the user database;
a transmittal condition database which stores the message IDs in association with:
a charge limit of how many times to transmit the message ID to any given user's terminal,
an absolute limit of how many times to transmit the message ID to all users,
a time period in which the message may be transmitted,
a charge for when the terminals activate the link to additional information;
a message searcher for selecting message IDs for transmitting from the transmittal condition database using characteristics read out from the user database by the characteristics reader, the charge limit, the absolute limit and the time period;
a request receiver for receiving requests from the terminals through the communications network, the requests reflective of the terminals having activated the links to additional information;
a statistics processor for:
counting a link count of how many times each of the links was activated, based upon receipt of the requests,
determining a fee due based upon the link count and the charge for when the terminals activate the link to additional information.

13. The system of claim 12 further comprising a statistics recording means having a storage for storing the fee due and the link count in association with the message IDs of the messages transmitted to the terminals.

14. The system of claim 12, wherein the message ID comprises a uniform resource locator (URL).

15. A system connected to plural terminals through a communication network for having messages transmitted to the terminals the messages further comprising information in digital form in the form of at least one of images, text, sounds and combinations thereof, at least some of the messages further comprising respective links to additional information in digital form available to the terminals through the communications network and related to the respective message, the messages being identified by message IDs, the system comprising:
a user database which stores characteristics of users of the terminals in association with respective user IDs;
a transmittal condition database which stores the message IDs in association with:
characteristics of a class of users to whom it would be appropriate to transmit the corresponding message,
a charge limit of how many times to transient the message ID to any given user,
an absolute limit of how many times to transmit the message ID to all users,
a time period in which the message ID may be transmitted,
a charge for when the terminals activate the link to additional information;
a user ID receiver for receiving the user IDs from the terminals through the communications network;
a characteristics reader for reading out the characteristics from the user database;
a message searcher for selecting message IDs for transmitting from the transmittal condition database based on the characteristics read out from the user database, the charge limit, the absolute limit and the time period;
a transmitter for transmitting message IDs selected by the message searcher to the terminals;
a request receiver for receiving requests from the terminals through the communications network, the requests reflective of the terminals having activated the links to additional information;
a statistics processor for:
counting a link count of how many times each of the links was activated, based upon receipt of the requests,
determining a fee due based upon the link count and the charge for when the terminals activate the link to additional information.

16. The system of claim 15, further comprising
a user ID storage for storing the user ID of users who operate a message transmitted to the terminal in association with the message ID of the transmitted message, wherein:
the transmittal condition database stores the message ID in association with other message ID of a related message; and the message searcher selects the message ID on a condition that the user ID storage stores the user ID of the user in association with the message ID of a related message.

17. A system connected to plural terminals through a communications network for having messages transmitted to the terminals, the messages comprising information in digital form in the form of at least one of images, text, sounds and combinations thereof, at least some of the messages further comprising respective links to additional information in digital form available to the terminals through the communications network and related to the respective message, the system comprising:
a transmittal condition database for storing plural message IDs which respectively identify messages to be transmitted to the terminals in association with:
a charge limit of how many times to transmit the message IDs to any given user,
an absolute limit of how many times to transient the message IDs to all users,
a time period in which the message ID may be transmitted,
a charge for when the terminals activate the link to additional information;
a transmitter for transmitting message IDs to the terminals based on the charge limit, the absolute limit and the time period;
a usage database for storing a parameter which indicates an amount of display by the terminals of the messages corresponding to the message IDs transmitted to the terminals;
a request receiver for receiving requests from the terminals through the communications network, the requests retlective of the terminals having activated the links to additional information;
a statistics processor for:
counting a link count of how many times each of the links was activated, based upon receipt of the requests,
determining a fee due based upon the link count and the charge for when the terminals activate the link to additional information.

18. The system of claim 17, wherein:
the transmittal condition database stores the message ID in association with characteristics of the class of users to whom it is appropriate to transmit the message;
the system further comprises:
a user database for storing the characteristics of users of the terminals,
a message searcher for selecting message IDs from the transmittal condition database based on the characteristics read out from the user database, the charge limit, the absolute limit and the time period.

19. The system of claim 17, further comprising:
an adder for increasing the value of a parameter when a message ID is transmitted by the transmitter;
means for selling a good or service to the user through the communications network;
means for determining the prices of the good or service depending on the value of the parameter;
a subtractor for decreasing the value of the parameter when the user orders the good or service.

20. The system of claim 21, wherein the message ID comprises a uniform resource locator (URL).

21. The system of claim 19 further comprising a message database which has a first message ID which increases the value of the parameter when transmitted to the terminals, and a second message which does not increase the value of the parameter when transmitted to the terminals.

22. The system of claim 17 further comprising:
an update information storage which stores update information updated independently from the terminals;
an update information transmitter for transmitting the update information to the terminals a predetermined number of times through the communications network.

23. The system of claim 22, wherein:
the predetermined number of times is one;
the update information transmitter transmits the update information to those terminals to which the update information has not been transmitted.

24. A system connected to plural terminals through a communications network for having messages transmitted to the terminals, the messages comprising information in digital form in the form of at least one of images, text, sounds and combinations thereof, at least some of the messages further comprising respective links to additional information in digital form available to the terminals through the communications network and related to the respective message, the system comprising:
a database which stores message IDs which identify messages in association with:
characteristics of users to whom it would be appropriate to transmit the corresponding message,
a charge limit of how many times to display the message to any given user,
an absolute limit of how many times to display the message to all users,
a time period in which the message may be displayed,
a charge for when the terminals activate the link to additional information;
a transmitter for transmitting selected message IDs to the terminals;
a user database which stores characteristics of users of the terminals in association with a user ID for identifying the user;
a user ID receiver for receiving the user ID from the terminals through the communications network;
a characteristics reader for reading out the characteristics of the users from the user database;
a message searcher for selecting message IDs from the database for transmitting using the characteristics read out from the user database by the characteristics reader, the charge limit, the absolute limit and the time period;
a request receiver for receiving requests from the terminals through the communications network, the requests reflective of the terminals having activated the links to additional information;
a statistics processor for:
counting a link count of how many times each of the links was activated, based upon receipt of the requests,
determining a fee due based upon the link count and the charge for when the terminals activate the link to additional information.

25. The system of claim 24, wherein the message ID comprises a uniform resource locator (URL).

26. A system connected to plural terminals through a communications network for having messages transmitted to the terminals, the messages comprising information in digital form in the form of at least one of images, text, sounds and combinations thereof, at least some of the messages further comprising respective links to additional information in digital form available to the terminals through the communications network and related to the respective message the system comprising:
- a message database which stores message IDs for identifying advertising messages;
- a user database which is connected to the communications network and which stores characteristics of users of the terminals, in association with a user ID;
- a transmittal condition database which stores message IDs in association with:
  - characteristics of a class of users to whom it would be appropriate to transmit the corresponding advertising message,
  - a charge limit of how many times to display the advertising message to any given user,
  - an absolute limit of how many times to display the advertising message to all users,
  - a time period in which the advertising message may be displayed,
  - a charge for when the terminals activate the link to additional information;
- a user ID receiver for receiving the user IDs from the terminals through the communications network;
- a characteristics reader for reading out the characteristics from the user database;
- a message searcher for selecting message IDs from the transmittal condition database using the characteristics read out from the user database by the characteristics reader, the charge limit, the absolute limit and the time period;
- a transmitter for transmitting the selected messages IDs to the terminals;
- a request receiver for receiving requests from the terminals through the communications network, the requests reflective of the terminals having activated the links to additional information;
- a statistics processor for:
  - counting a link count of how many times each of the links was activated, based upon receipt of the requests,
  - determining a fee due based upon the link count and the charge for when the terminals activate the link to additional information.

27. The system of claim 26, further comprising:
a user ID storage for storing the user ID of users who operate an advertising message transmitted to the terminal, in association with the message ID of the advertising message, wherein:
  the transmittal condition database stores the message ID of the advertising message in association with the message ID of related advertising messages;
  the message searcher searches for the message ID stored in the transmittal condition database in association with the message ID of related advertising messages, which is further stored in the user ID storage in association with the user ID of the user who requested the advertising message.

28. A method of providing messages to client devices of users, the client devices connected to a data network for receiving information, the method comprising:
registering the plural users to receive messages comprising information in digital form in the form of at least one of images, texts, sounds and combinations thereof;
providing a database of identifiers of the registered users, the database further including for each registered user a parameter and a value of the parameter;
assigning an initial value for the parameter for a given registered user, the given registered user having a client device;
transmitting a message to the client device of the given registered user;
in response to the client device displaying the transmitted message, increasing the value of the parameter assigned to the given registered user by a first predefined amount;
receiving an order receipt response from an on-line merchant for an on-line purchase by the given registered user, the order receipt response including a cost amount;
querying the database to determine the value of the parameter assigned to the given registered user;
if the assigned value is at least as much as the cost amount, then transmitting a payment acceptance response to thereby approve the purchase authorization request from the on-line merchant;
subtracting the cost amount from the value of the parameter assigned to the given registered user.

29. The method of providing messages to client devices of users, the client devices connected to a data network for receiving information of claim 28, further comprising, in response to the client device of the given registered user performing a second predefined on-line action, increasing the amount of the parameter assigned to the given registered user by a second predefined amount, wherein the first predefined amount is different than the first predefined amount.

30. The method of providing messages to client devices of users, the client devices connected to a data network for receiving information of claim 28 wherein the predefined on-line action comprises displaying a particular on-line advertisement.

31. The method of providing messages to client devices of users, the client devices connected to a data network for receiving information of claim 28 wherein the predefined on-line action comprises responding to the display of a particular on-line advertisement.

32. The method of providing messages to client devices of users, the client devices connected to a data network for receiving information of claim 28 wherein the predefined on-line action comprises displaying a particular on-line message.

33. The method of providing messages to client devices of users, the client devices connected to a data network for receiving information of claim 28 wherein the initial value of the parameter is greater than zero.

34. The method of providing messages to client devices of users, the client devices connected to a data network for receiving information of claim 28, further comprising:
storing in the database information about a credit card account of the registered user, the information including a credit card number;
wherein if the assigned value is less than the cost amount, then using a conversion of the parameter to an actual currency to charge the credit card account of the given registered user an amount of actual currency equal to the difference between the assigned value and the cost amount.

35. The method of providing messages to client devices of users, the client devices connected to a data network for receiving information of claim 28, further comprising:
storing in the database information about a bank account of the registered user, the information including an account number;

wherein if the assigned amount is less than the cost amount, then using a conversion of the parameter to an actual currency to transfer from the bank account of the given registered user an amount of actual currency equal to the difference between the assigned amount and the cost amount.

36. A method of having advertising messages transmitted to plural terminals connected to a communication network, the advertising messages comprising information in digital form in the form of at least one of images, text, sounds and combinations thereof, at least some of the advertising messages further comprising respective links to additional information in digital form available to the terminals through the communications network and related to the respective advertising message, the method comprising:

provided a first database which stores message IDs for the advertising messages in association with:
a charge limit of how many times to display the advertising message to any given user,
an absolute limit of how many times to display the advertising message to all users,
a time period in which the advertising message may be displayed,
a charge for when the terminals activate the link to additional information;
selecting message IDs for transmitting from the first database using the charge limit, the absolute limit and the time period;
transmitting the selected message IDs to the terminals;
receiving requests from the terminals through the communications network, the requests reflective of the terminals having activated the links to additional information;
counting a link count of how many times each of the links was activated, based upon receipt of the requests;
determining a fee due based upon the link count and the charge for when the terminals activate the links to additional information.

37. The method of having advertising messages transmitted to plural terminals connected to a communication network of claim 36, wherein the first database also stores, for plural message IDs, characteristics of a class of users to whom it would be appropriate to transmit the corresponding advertising messages, the method further comprising:

providing a user database storing characteristics of plural users in association with a user ID of each user;
reading out the characteristics from the user database based on the user ID; retrieving message IDs from the first database based on the characteristics read out from the user database.

38. The method of having advertising messages transmitted to plural terminals connected to a communication network of claim 36, further comprising:

increasing a value of a parameter when a message ID is transmitted by the transmitter;
offering a good or service to the user through the communications network;
determining prices of the good or service depending on the value of the parameter;
decreasing the value of the parameter when the user orders the good or service.

39. The method of having advertising messages transmitted to plural terminals connected to a communication network of claim 36 wherein the message ID comprises a uniform resource locator (URL).

40. The method of having advertising messages transmitted to plural terminals connected to a communication network of claim 38 wherein the first database has a first message ID which increases the value of the parameter when the corresponding advertising message is displayed, and a second message ID which does not increase the value of the parameter when the corresponding advertising message is displayed.

41. The method of having advertising messages transmitted to plural terminals connected to a communication network of claim 38 wherein the value of the parameter is increased when the user inputs a correct answer to a question displayed in the advertising message.

42. The method of having advertising messages transmitted to plural terminals connected to a communication network of claim 36 further comprising:

providing an update information storage which stores update information being updated independently of the terminal;
transmitting the update information to the terminal a predetermined number of times through the communications network.

43. The method of having advertising messages transmitted to plural terminals connected to a communication network of claim 42 wherein the predetermined number of times is one, the method further comprising determining whether the update information has already been transmitted to the user, and transmitting the update information when it is determined that the update information has not already been transmitted.

44. The method of having advertising messages transmitted to plural terminals connected to a communication network of claim 42 further comprising:

counting, for each user, the number times the update information has been transmitted;
transmitting the update information to a user when the update information has not been transmitted to that user the predetermined number of times.

45. The method of having advertising messages transmitted to plural terminals connected to a communication network of claim 44 further comprising:

comparing the time which has elapsed since the last transmission of the update information with a predetermined period of time;
transmitting the update information when the time lapse is longer than the predetermined period of time.

46. A method for having messages transmitted to plural terminals connected to a communication network, the messages comprising information in digital form in the form of at least one of images, text, sounds and combinations thereof, at least some of the messages further comprising respective links to additional information in digital form available to the terminals through the communications network and related to the respective message, the method comprising:

transmitting selected message IDs to the terminal, the message IDs identifying messages;
providing a user database which stores characteristics of users of the terminals, in association with user IDs;
receiving the user IDs from the terminals;
reading the characteristics from the user database;
providing a transmittal condition database which stores the message IDs in association with:
a charge limit of how many times to transmit the message ID to any given users, terminal,
an absolute limit of how many times to transmit the message ID to all users,
a time period in which the message many be transmitted, a charge for when the terminals activate the link to additional information;

selecting message IDs for transmitting from the transmittal condition database using characteristics read out from the user database, the charge limit, the absolute limit and the time period;

receiving requests from the terminals through the communications network, the requests reflective of the terminals having activated the links to additional information;

counting a link count of how many times each of the links was activated, based upon receipt of the requests;

determining a fee due based upon the link count and the charge for when the terminals activate the link to additional information.

47. The method for having messages transmitted to plural terminals connected to a communication network of claim 46 further comprising storing the fee due and the link count in association with the message IDs of the messages transmitted to the terminals.

48. The method for having messages transmitted to plural terminals connected to a communication network of claim 46, wherein the message ID comprises a uniform resource locator (URL).

49. A method of having messages transmitted to plural terminals connected to a communication network, the messages further comprising information in digital form in the form of at least one of images, text, sounds and combinations thereof, at least some of the messages further comprising respective links to additional information in digital form available to the terminals through the communications network and related to the respective message, the messages being identified by message IDs, the method comprising:

providing a user database which stores characteristics of users of the terminals in association with respective user IDs;

providing a transmittal condition database which stores:
the message IDs in association with characteristics of a class of users to whom it would be appropriate to transmit the corresponding message,
a charge limit of how many times to transmit the message ID to any given user,
an absolute limit of how many times to transmit the message ID to all users,
a time period in which the message ID may be transmitted,
a charge for when the terminals activate the link to additional information;

receiving the user IDs from the terminals through the communications network;

reading out the characteristics from the user database;

selecting message IDs for transmitting from the transmittal condition database based on the characteristics read out from the user database, the charge limit, the absolute limit and the time period;

transmitting selected message IDs to the terminals;

receiving requests from the terminals through the communications network, the requests retlective of the terminals having activated the links to additional information;

counting a link count of how many times each of the links was activated, based upon receipt of the requests;

determining a fee due based upon the link count and the charge for when the terminals activate the link to additional information.

50. The method of having messages transmitted to plural terminals connected to a communication network of claim 49, wherein the transmittal condition database stores at least one message ID in association with a message ID of a related message the method further comprising:

storing the user ID of users who operate a message transmitted to the terminals in association with corresponding message IDs;

selecting message IDs on a condition that the user ID storage stores the user ID of the user in association with the message ID of a related message.

51. A method of having messages transmitted to plural terminals connected to a communications network, the messages comprising information in digital form in the form of at least one of images, text, sounds and combinations thereof, at least some of the messages further comprising respective links to additional information in digital form available to the terminals through the communications network and related to the respective messages, the method comprising:

providing a transmittal condition database for storing plural message IDs which respectively identify messages to be transmitted to the terminals in association with:
a charge limit of how many times to transmit the message IDs to any given user,
an absolute limit of how many times to transmit the message IDs to all users,
a time period in which the message ID may be transmitted,
a charge for when the terminals activate the link to additional information, transmitting message IDs to the terminals based on the charge limit, the absolute limit and the time period;

storing a parameter which indicates an amount of display by the terminals of the messages corresponding to the message IDs transmitted to the terminals;

receiving requests from the terminals through the communications network, the requests reflective of the terminals having activated the links to additional information;

counting a link count of how many times each of the links was activated, based upon receipt of the requests;

determining a fee due based upon the link count and the charge for when the terminals activate the link to additional information.

52. The method of having messages transmitted to plural terminals connected to a communications network of claim 51, wherein:

the transmittal condition database stores the message ID in association with characteristics of the class of users to whom it is appropriate to transmit the message;

the method further comprises:
providing a user database for storing the characteristics of users of the terminals,
selecting message IDs from the transmittal condition database based on the characteristics read out from the user database, the charge limit, the absolute limit and the time period.

53. The method of having messages transmitted to plural terminals connected to a communications network of claim 51, further comprising:

increasing the value of a parameter when a message ID is transmitted;

selling a good or service to the user through the communications network;

determining the prices of the good or service depending on the value of the parameter;

decreasing the value of the parameter when the user orders the good or service.

54. The method of having messages transmitted to plural terminals connected to a communications network of claim 51, wherein the message ID comprises a uniform resource locator (URL).

55. The method of having messages transmitted to plural terminals connected to a communications network of claim 53 further comprising providing a message database which has a first message ID which increases the value of the parameter when transmitted to the terminals, and a second message which does not increase the value of the parameter when transmitted to the terminals.

56. The method of having messages transmitted to plural terminals connected to a communications network of claim 51, further comprising:
   storing update information updated independently from the terminals;
   transmitting the update information to the terminals a predetermined number of times through the communications network.

57. The method of having messages transmitted to plural terminals connected to a communications network of claim 56, wherein:
   the predetermined number of times is one;
   the update information is transmitted to those terminals to which the update information has not been transmitted.

58. A method of having messages transmitted to plural terminals connected to a communications network, the messages comprising information in digital form in the form of at least one of images, text, sounds and combinations thereof, at least some of the messages further comprising respective links to additional information in digital form available to the terminals through the communications network and related to the respective message, the method comprising:
   providing a database which stores message IDs which identity messages in association with:
      characteristics of users to whom it would be appropriate to transmit the corresponding message,
      a charge limit of how many times to display the message to any given user,
      an absolute limit of how many times to display the message to all users,
      a time period in which the message may be displayed,
      a charge for when the terminals activate the link to additional information;
   transmitting, selected message IDs to the terminals;
   providing a user database which stores characteristics of users of the terminals in association with a user ID for identifying the user;
   receiving the user ID from the terminals through the communications network;
   reading out the characteristics of the users from the user database;
   selecting message IDs from the database for transmitting using the characteristics read out from the user database, the charge limit, the absolute limit and the time period;
   receiving requests from the terminals through the communications network, the requests reflective of the terminals having activated the links to additional information;
   counting a link count of how many times each of the links was activated, based upon receipt of the requests;
   determining a fee due based upon the link count and the charge for when the terminals activate the link to additional information.

59. The method of having messages transmitted to plural terminals connected to a communications network of claim 58, wherein the message ID comprises a uniform resource locator (URL).

60. A method of having advertising messages transmitted to plural terminals connected to a communications network, the messages comprising information in digital form in the form of at least one of images, text, sounds and combinations thereof, at least some of the messages further comprising respective links to additional information in digital form available to the terminals through the communications network and related to the respective message, the system comprising:
   providing a message database which stores message IDs for identifying advertising messages;
   providing a user database which is connected to the communications network and which stores characteristics of users of the terminals, in association with a user ID;
   providing a transmittal condition database which stores message IDs in association with:
      characteristics of a class of users to whom it would be appropriate to transmit the corresponding advertising message,
      a charge limit of how many times to display the advertising message to any given user,
      an absolute limit of how many times to display the advertising message to all users,
      a time period in which the advertising message may be displayed,
      a charge for when the terminals activate the link to additional information;
   receiving the user IDs from the terminals through the communications network;
   reading out the characteristics from the user database;
   selecting message IDs from the transmittal condition database using the characteristics read out from the user database, the charge limit, the absolute limit and the time period;
   transmitting the selected messages IDs to the terminals;
   receiving requests from the terminals through the communications network, the requests reflective of the terminals having activated the links to additional information;
   counting a link count of how many times each of the links was activated, based upon receipt of the requests;
   determining a fee due based upon the link count and the charge for when the terminals activate the link to additional information.

61. The method of having advertising messages transmitted to plural terminals connected to a communications network of claim 60, further comprising,
   storing the user ID of users who operate an advertising message transmitted to the terminal, in association with the message ID of the advertising message, wherein:
   the transmittal condition database stores the message ID of the advertising message in association with the message ID of related advertising messages,
   message IDs are selected from the transmittal condition database in association with the message ID of related advertising messages, which is further stored in the user ID storage in association with the user ID of the user who requested the advertising message.

62. The method of having advertising messages transmitted to plural terminals connected to a communications network of claim 60, wherein the message ID comprises a uniform resource locator (URL).

* * * * *